US008706024B2

(12) United States Patent
Cugnini et al.

(10) Patent No.: US 8,706,024 B2
(45) Date of Patent: Apr. 22, 2014

(54) SYSTEM AND METHOD FOR PROVIDING INTERACTIVE MOBILE CONTENT USING MULTIPLE COMMUNICATION PATHS

(76) Inventors: Aldo G. Cugnini, Long Valley, NJ (US); Louis H. Libin, Woodmere, NY (US)

( * ) Notice: Subject to any disclaimer, the term of this patent is extended or adjusted under 35 U.S.C. 154(b) by 635 days.

(21) Appl. No.: 12/965,023

(22) Filed: Dec. 10, 2010

(65) Prior Publication Data

US 2011/0143667 A1    Jun. 16, 2011

Related U.S. Application Data

(60) Provisional application No. 61/284,056, filed on Dec. 11, 2009.

(51) Int. Cl.
*H04H 20/71* (2008.01)
(52) U.S. Cl.
USPC ...... 455/3.01; 455/3.02; 455/414.3; 455/345; 725/106; 725/63
(58) Field of Classification Search
USPC ......... 455/3.01–3.06, 503, 555, 556.1, 556.2, 455/404.2, 411, 414.3, 344–346; 725/118, 725/106, 109, 112, 123, 13, 50, 1, 63
See application file for complete search history.

(56) References Cited

U.S. PATENT DOCUMENTS

| | | | |
|---|---|---|---|
| 6,167,255 A | | 12/2000 | Kennedy, III et al. |
| 6,532,495 B1 | | 3/2003 | Welles, II et al. |
| 6,842,433 B2 | * | 1/2005 | West et al. ............. 370/312 |
| 7,096,489 B2 | | 8/2006 | Kitsukawa et al. |

(Continued)

OTHER PUBLICATIONS

Hybrid Broadcast Broadband TV, ETSI TS 102 796 V1.1.1 (Jun. 2010) Technical Specification, ETSI, 650 Route des Lucioles, F-06921 Sophia Antipolis Cedex—France, © European Telecommunications Standards Institute 2010, © European Broadcasting Union 2010, http://www.etsi.org/deliver/etsi_ts/102700_102799/102796/01.01.01_60/ts_102796v010101p.pdf.

(Continued)

*Primary Examiner* — Sujatha Sharma
(74) *Attorney, Agent, or Firm* — David Alan Bryan

(57) ABSTRACT

A method of and system for providing interactive services to a set of mobile devices is provided, comprising: providing at least one set of first information adapted for over-the-air broadcast to a set of mobile devices by at least one first facility, wherein the first information is selected from the group comprising program content, basic information and cloud content; providing at least one set of second information adapted for transmission to at least one of the mobile devices by at least one second facility, wherein the second information is selected from the group comprising non-linear information, on-demand information, cloud content and user-defined content, and wherein the second facility comprises a transmitter selected from the group comprising a short range wireless transmitter in intermittent communication with at least one of the mobile devices and a long range wireless transmitter; and receiving at least one set of third information based on information selected from the group comprising the first information and the second information from at least one of the mobile devices, wherein the third information is forwarded by a third facility comprising a receiver selected from the group comprising a short range wireless receiver in intermittent communication with at least one of the mobile devices and a long range wireless receiver.

22 Claims, 27 Drawing Sheets

(56) References Cited

U.S. PATENT DOCUMENTS

| | | | |
|---|---|---|---|
| 8,443,390 B2 * | 5/2013 | Lo et al. | 725/50 |
| 2002/0157107 A1 | 10/2002 | Kitsukawa et al. | |
| 2003/0177504 A1 * | 9/2003 | Paulo et al. | 725/118 |
| 2005/0138661 A1 * | 6/2005 | Matsukawa | 725/62 |
| 2006/0271562 A1 * | 11/2006 | Kato | 707/10 |
| 2009/0031335 A1 * | 1/2009 | Hendricks et al. | 725/1 |
| 2012/0144414 A1 * | 6/2012 | Huegel et al. | 725/13 |

OTHER PUBLICATIONS

Alcatel-Lucent'S Proposal for Unlimited Mobile TV: A Hybrid Satellite/Terrestrial Broadcast Network Based on DVB-SH, Philippe Laine, Alcatel-Lucent Mobile Broadcast, France, e-mail: philippe.laine@alcatel-lucent.com, © Alcatel-Lucent—Aug. 2007, http://www.alcatel-lucent.com/technology/mobile_tv/docs/Unlimited_MobileTVwhitepaper_August2007.pdf.

* cited by examiner

US 8,706,024 B2

SYSTEM AND METHOD FOR PROVIDING INTERACTIVE MOBILE CONTENT USING MULTIPLE COMMUNICATION PATHS

CROSS REFERENCE TO RELATED APPLICATIONS

This application claims the benefit of U.S. Provisional Patent Application No. 61/284,056, filed Dec. 11, 2009, and entitled System and Method for Providing Interactive Mobile Content Using Multiple Communication Paths, the entire disclosure of which is incorporated herein by reference. This application is also related to U.S. patent application Ser. No. 12/913,730, filed Oct. 27, 2010, and entitled System and Method for Content Browsing Using a Non-Realtime Connection. This application is also related to U.S. patent application Ser. No. 12/875,026, filed Sep. 2, 2010, and entitled System, Method and Computer Software Product for Providing Interactive Data Using a Mobile Device. This application is also related to U.S. patent application Ser. No. 12/833,759, filed Jul. 9, 2010, and entitled System and Method for Providing Interactive Services Using a Mobile Device.

BACKGROUND

Emerging mobile devices will provide access to video, audio and other content, and additional content-related information. As only one example, existing mobile information browsing devices that feature content browsing require a continuous two-way connection with the content host server by means of a two-way radio connection, such as by WiFi or the cellular public service telephone network. Such a system constrains real-time content browsing to the physical location of the wireless access point (WAP), or to the use of a cellular network that incurs usage tariffs. The instant invention makes content browsing possible without the need for constant proximity to a WAP, and without incurring cellular network tariffs, or other access costs. More generally, the invention provides a system and method that allows a content provider or service manager to provide different levels of service, as well as to provide for the most efficient utilization of the available communication channels.

SUMMARY OF THE INVENTION

In a first aspect, a method of providing interactive services to a set of mobile devices, comprising: providing at least one set of first information adapted for over-the-air broadcast to a set of mobile devices by at least one first facility, wherein the first information is selected from the group comprising program content, basic information and cloud content; providing at least one set of second information adapted for transmission to at least one of the mobile devices by at least one second facility, wherein the second information is selected from the group comprising non-linear information, on-demand information, cloud content and user-defined content, and wherein the second facility comprises a transmitter selected from the group comprising a short range wireless transmitter in intermittent communication with at least one of the mobile devices and a long range wireless transmitter; and receiving at least one set of third information based on information selected from the group comprising the first information and the second information from at least one of the mobile devices, wherein the third information is forwarded by a third facility comprising a receiver selected from the group comprising a short range wireless receiver in intermittent communication with at least one of the mobile devices and a long range wireless receiver, is provided.

In a second aspect, a system for providing interactive services to a set of mobile devices, comprising: a source of at least one set of first information adapted for over-the-air broadcast to a set of mobile devices by at least one first facility, wherein the first information is selected from the group comprising program content, basic information and cloud content; a source of at least one set of second information adapted for transmission to at least one of the mobile devices by at least one second facility, wherein the second information is selected from the group comprising non-linear information, on-demand information, cloud content and user-defined content, and wherein the second facility comprises a transmitter selected from the group comprising a short range wireless transmitter in intermittent communication with at least one of the mobile devices and a long range wireless transmitter; and a receiver of at least one set of third information based on information selected from the group comprising the first information and the second information from at least one of the mobile devices, wherein the third information is forwarded by a third facility comprising a receiver selected from the group comprising a short range wireless receiver in intermittent communication with at least one of the mobile devices and a long range wireless receiver, is provided.

In a third aspect, a method of providing interactive services to a mobile device, comprising: receiving by a mobile device at least one set of first information adapted for over-the-air broadcast to the mobile device from at least one first facility, wherein the first information is selected from the group comprising program content, basic information and cloud content; receiving at least one set of second information adapted for transmission to the mobile device from at least one second facility, wherein the second information is selected from the group comprising non-linear information, on-demand information, cloud content and user-defined content, and wherein the second facility comprises a transmitter selected from the group comprising a short range wireless transmitter in intermittent communication with the mobile device and a long range wireless transmitter; and transmitting at least one set of third information based on information selected from the group comprising the first information and the second information, wherein the third information is received by a third facility comprising a receiver selected from the group comprising a short range wireless receiver in intermittent communication with the mobile device and a long range wireless receiver, is provided.

In embodiments the invention addresses a solution for providing pushed, and/or pulled, and/or linear and/or non-linear content to an interactive mobile device.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

In the Drawings.

DETAILED DESCRIPTION

Figure 1:
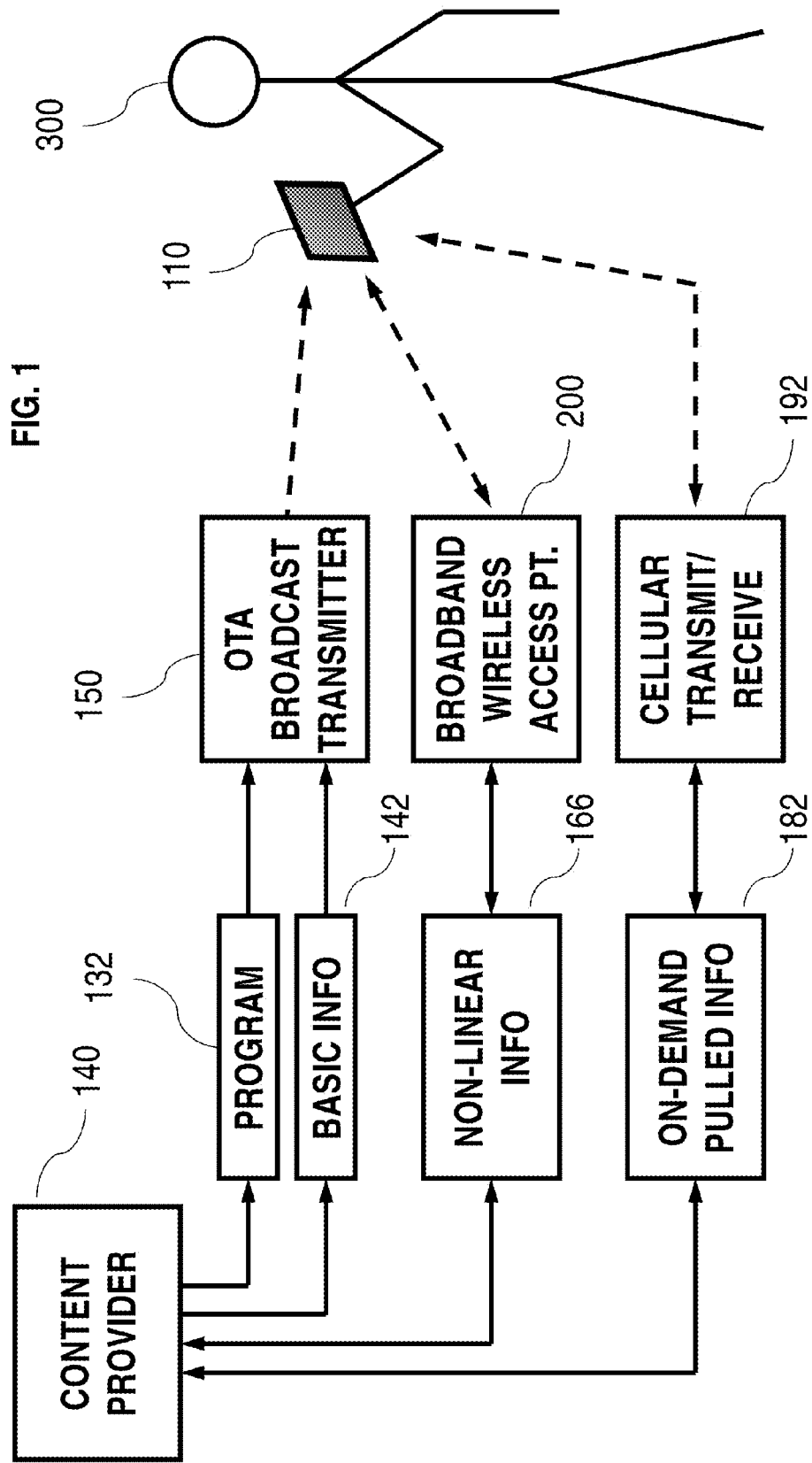
FIG. 1 shows a basic block diagram of one embodiment.

Certain terminology is used herein for convenience only and is not to be taken as a limitation on the embodiments of the present invention. In the drawings, the same reference letters are employed for designating the same elements throughout the several figures.

The words "right", "left", "lower" and "upper" designate directions in the drawings to which reference is made. The terminology includes the words above specifically mentioned, derivatives thereof and words of similar import.

Certain terminology is used herein for convenience only and is not to be taken as a limitation on the embodiments of the present invention. In the drawings, the same reference letters are employed for designating the same elements throughout the several figures.

Referring to FIG. 1, the invention is may utilize, but is not limited to utilizing, one or more of the following technologies: digital video mobile transmission and reception, Internet data communications, long-distance wireless communication, short-distance wireless data communication, Wi-Fi/WiMAX networks, IEEE-802.11x wireless communication, cellular telephone data networks, CDMA networks, 3G/4G networks, and LTE networks.

Digital mobile video transmission may include over-the-air transmission according to any of a variety of standardized transmission protocols, such as ATSC, ATSC Mobile, DVB-T, DVB-H, ISDB-T, 1-Seg, DMB-T, and MBMS, among others, as well as proprietary services such as Sirius satellite video, MediaFlo, "wireless cable" and the like. In general any transmission system capable of supporting over-the-air real time transmission of multimedia information may be used.

Internet data communications may include connections to the Internet provided by any number of access technologies such as digital cable, Digital Subscriber Line (DSL), WiFi, WiMax and the like, whether provided by private Internet Service Providers (ISPs) or public entities such as municipal WiFi networks. In general any transmission system capable of supporting transmission of digital information to and from the Internet at a sufficiently high rate may be used.

Long distance wireless communication may include protocols such as 3G, LTE, GPRS, and CDMA. In general any transmission system capable of supporting wireless transmission of information over relatively long distances at a sufficiently high rate may be used.

Short-distance wireless data communication may include protocols such as IEEE 802.11, Zigbee, Ultra-wideband (UWB), and Bluetooth. Short-distance wireless data communication may also include optical methods such as an Infrared communications link. In general any transmission system capable of supporting short-range wireless transmission of information at a sufficiently high rate may be used.

Bluetooth is a well known standard for short-range digital communications that includes variants capable of supporting real-time transmission of audio-visual information.

In one embodiment, a mobile user-operated receiver (110) may allow the user (300) to receive over-the-air (OTA) broadcasts (130) that may contain program content (132) such as video and audio, as well as basic information content (142) such as data, information, web pages, applications, and the like. The program content (132) and basic information content (142) may be provided by a content provider (140) such as a broadcaster. The basic information content (142) may be related to the program content (132).

In addition to the program content (132) and basic information content (142) that may be broadcast in a one-to-many transmission (130) to a plurality of mobile user-operated receivers (110), additional information may be made available to the mobile user-operated receivers (110), in the form of non-linear information (166) and on-demand pulled information (182). This additional information may comprise data, information, web pages, applications, and the like, may be closely related to the program content (132), and may be accessed in an interactive fashion by means of a two-way communication. For example, the on-demand information (182) may comprise information for "enhancing" the experience of viewing a sports event, such as updated statistics on a game in progress. The non-linear information (166) may be only sporadically accessed when the mobile user-operated receiver (110) is in close proximity to a wireless access point (200) or network of wireless access points. The on-demand pulled information (182), however, may be accessed by means of a cellular transmitter (192), and may thus be accessed on demand.

The various data paths via transmitters and/or receivers (150), (200) and (192) may therefore support different "tiers" of service to the mobile user-operated receivers (110), and these tiers may be fixed or adjustable as the content provider (140) or user so chooses. These tiers may allow for different classes of subscribers, as well as allow the content provider (140) to efficiently manage the limitations of each of the communication paths.

In one embodiment, the basic information (142) path provides a "basic" service to the user, which may be provided free of charge. The on-demand pulled information (182) may be provided as a "premium" service that is provided in return for a subscription or "per use" fee. The non-linear information (166) may be provided as either a basic or premium service, or a delimited combination of the two. Those skilled in the art will recognize that the basic information (142) and on-demand pulled information (182) may have a high relevancy and immediacy to simultaneously-broadcast program content (132), but the non-linear information (166) may have less relevancy and immediacy to simultaneously-broadcast program content (132), as the non-linear information (166) may be transferred to the mobile user-operated receiver (110) only on a sporadic basis, for example, only when the mobile receiver (110) is in close proximity to wireless access point (200) For this reason, different levels of service may be provided to a user or users.

Figure 2:
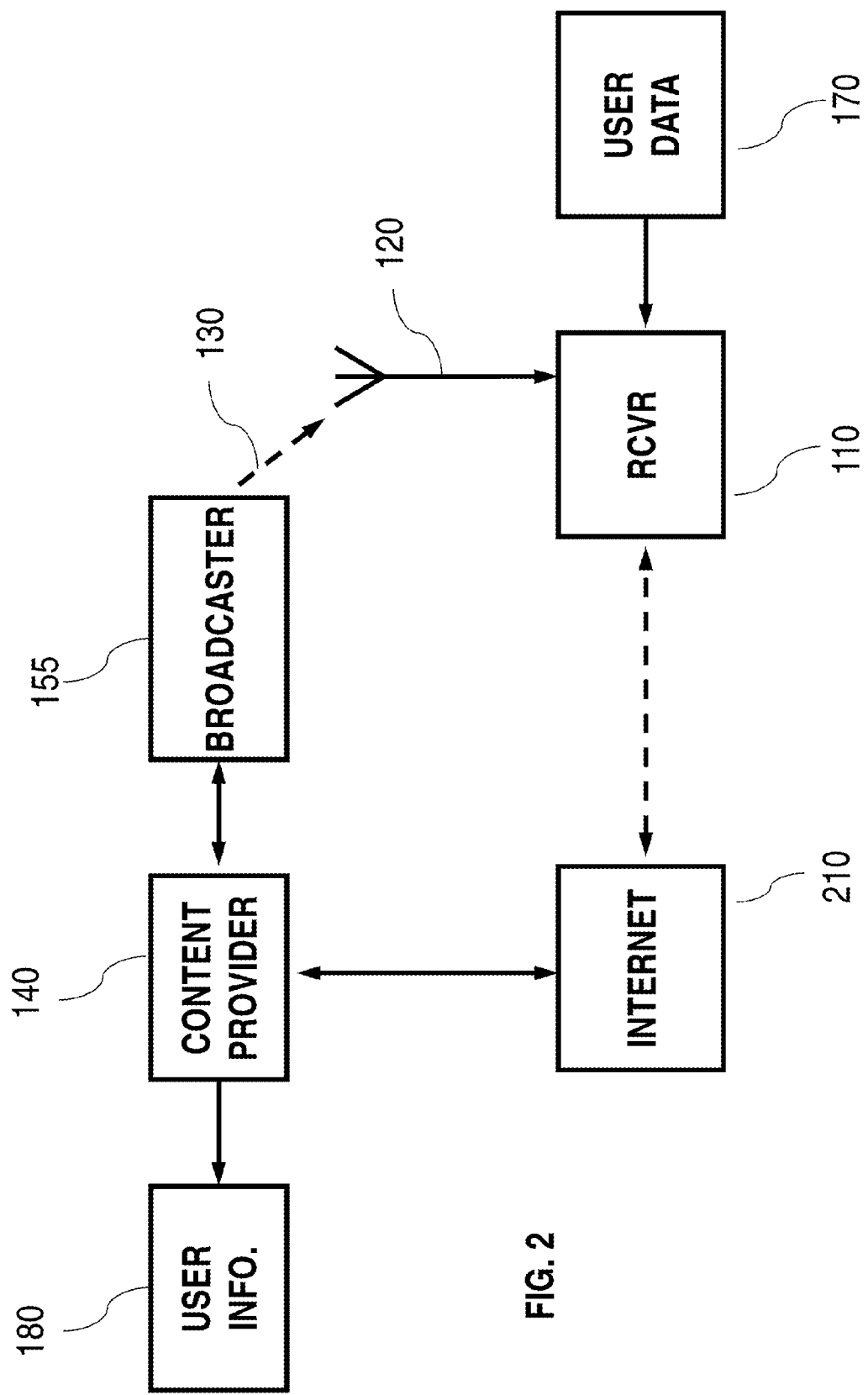
FIG. 2 shows a block diagram of one 1 embodiment illustrating interactivity between a user-operated receiver and a content provider.

Referring to FIG. 2, a user-operated receiver (110) provides entertainment, such as audio-visual programming and the like, to a user. The user-operated receiver uses an antenna (120) to receive programs by means of an over-the-air transmission (130) that is sent by a broadcaster (155). The broadcaster (155) may include an over-the-air transmission facility. Alternatively, the broadcaster (155) may communicate with a separate over-the-air transmission facility, as described in more detail below. This over-the-air transmission is inherently uni-directional, so, interactive return information in the form of user data (170) may be provided to the content provider (140) as user information (180) by means of, in some embodiments, an Internet connection (210).

Interactive return information may include, for example, time-sensitive information such as responses to polls and/or games presented to a viewer using a display associated with receiver (110), as well as less time sensitive information such as requests for further information about a product and/or user demographic information. In general interactive return information may include any information supplied by the user as user data (170).

Figure 3:
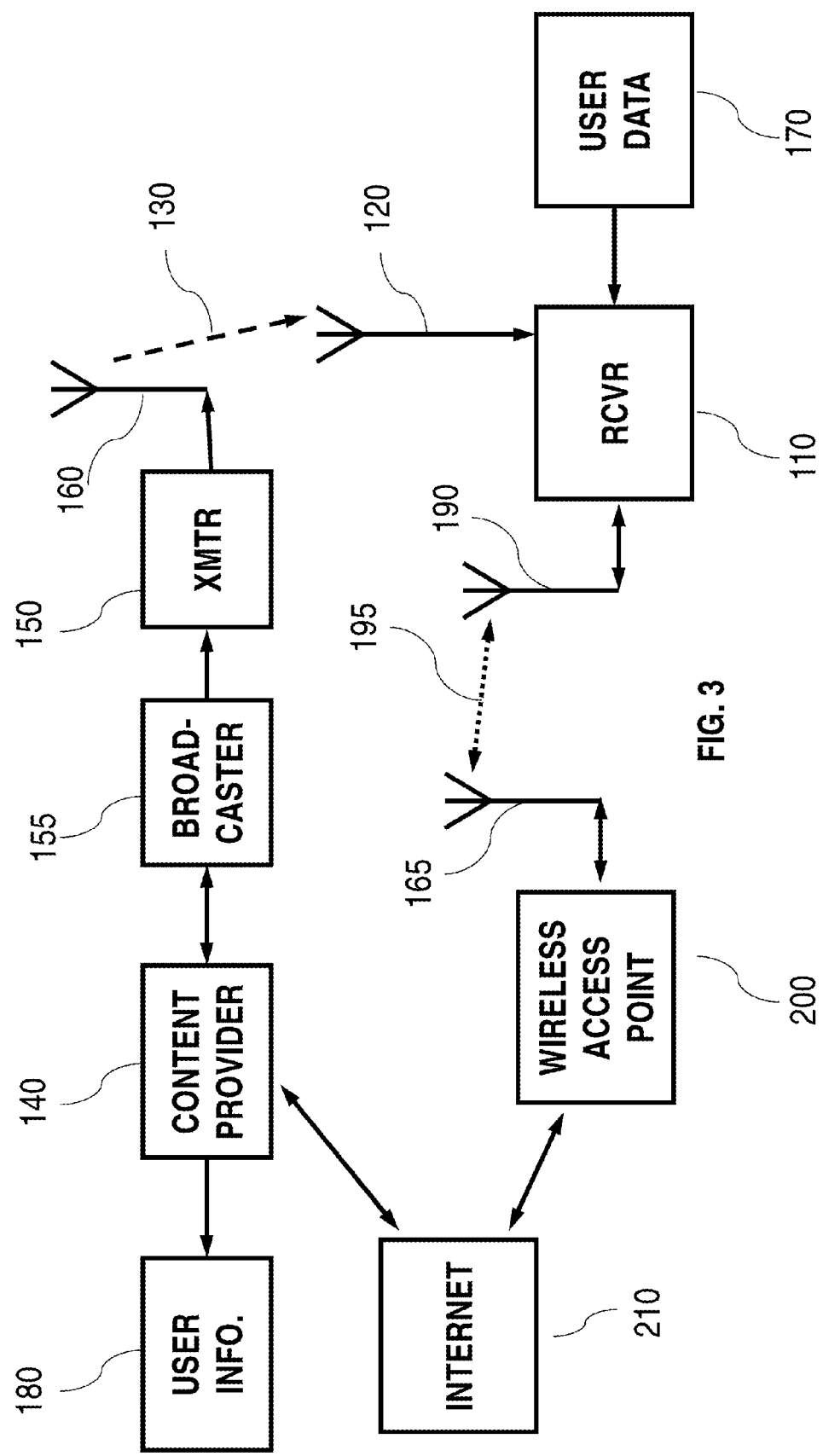
FIG. 3 shows a user-operated receiver in communication with a user-maintained wireless access point to relay user data to a content provider.

Referring now to FIG. 3, in some embodiments, the user-operated receiver (110) communicates with a user-maintained wireless access point (200) to relay user data to the content provider (140) by means of antenna (190) and wireless connection (195). This data may then be relayed to the content provider (140) by means of the Internet connection (210). In a likewise fashion, the content provider (140) may send data directly to the user-operated receiver (110) by means of the Internet and wireless access point (200), which wireless access point may, in some embodiments, be maintained by the user. The broadcaster (155) may use a transmitter (150) and antenna (160) to implement the over-the-air transmission (130). The transmission facility comprising the transmitter (150) and antenna (160) may or may not be maintained by the broadcaster.

In some embodiments, user-operated receiver (110) may use a bi-directional wireless connection (195) to communicate with wireless access point (200) by means of antenna (190). In some embodiments, bi-directional connection (195) may comprise two uni-directional connections, e.g., one connection from receiver (110) to wireless access point (200) and one connection from wireless access point (200) to receiver (110).

In some embodiments, the user data (170) includes a history of the user's audio-visual program viewing, and other user preferences. The user data (170) may then be relayed to the content provider by means of a wireless connection, for example, an IEEE 802.11 connection, and the Internet connection (210), for example, an Internet connection provided by the user's Internet Service Provider (ISP). The complete return data path communication may be automated, so that no direct user input is required.

In some embodiments, the content provider may send data to the user-operated receiver (110) over Internet connection (210) and wireless connection (195). This data may include applications that may execute on the user-operated receiver, including user-interface applications and the like.

In some embodiments, as illustrated by the preceding examples, Internet connection (210) and wireless connection (195) need not be bi-directional, For example if there is no requirement to transmit data from the content provider to the receiver (110), then wireless connection (195) may be uni-directional from receiver (110) to wireless access point (200) and Internet connection (210) may be uni-directional from wireless access point (200) to content provider (140). Likewise at any given instant, and even for extended periods of time, in some embodiments there may be no need to transmit any user data (170), and in such embodiments Internet connection (210) need only be uni-directional from content provider (140) to wireless access point (200), and wireless connection (195) need only be uni-directional from wireless access point (200) to receiver (110) the vast majority of the time. However, it should be noted that in most embodiments there may be at least some brief bi-directional communications over wireless connection (195) and/or Internet connection (210) to set up and possibly secure wireless connection (195) for subsequent data communications, which data communications may be uni-directional as described above. Protocols for setting up and, if necessary, securing wireless connections such as wireless connection (195) are well known in the art. For example most lap top computers comprising IEEE 802.11/WiFi capability also comprise software that can set up and secure connections to wireless access points. Such connections may be set up automatically, e.g., in the case of access points that have been used before, or semi-automatically, e.g., in cases where the computer has detected a previously-unused access point. The invention is agnostic as to the details of connection (195) set up insofar as the set up may comprise automatic, semi-automatic, or manual (e.g., requiring some level of user intervention) steps.

Figure 4:
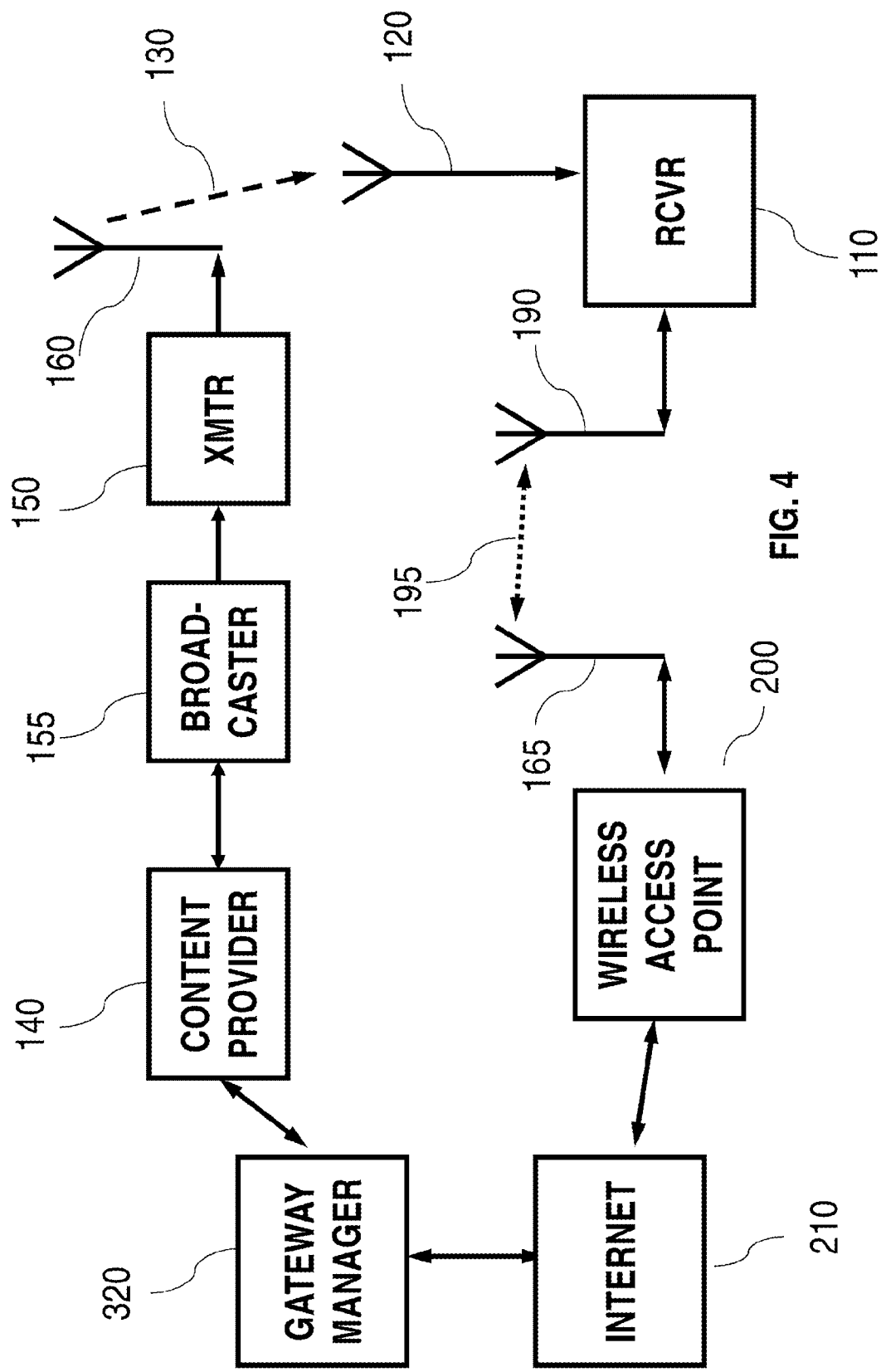
FIG. 4 shows a basic block diagram of one embodiment comprising a gateway manager.

Referring now to FIG. 4, in some embodiments, a gateway manager (320) may interface with content provider (140) and, via Internet connection (210), a wireless transmission/reception facility comprising a wireless access point (200), which uses an antenna (165) to receive and/or transmit information by means of wireless connection (195). For example, in some embodiments wireless access point (200) may be considered to comprise part of a distributed transmission/reception facility of an Internet Service Provider (ISP). In general wireless access point (200) may comprise part of any transmission/reception facility capable of communicating with mobile device (110) at a data rate sufficient to support wireless connection (195) without loss of data. For example in some embodiments mobile device (110) may comprise an audio/visual (A/V) receiver comprising an IEEE 802.11 wireless interface, and wireless access point (200) may support IEEE 802.11 communications with the mobile device (110).

Figure 5:
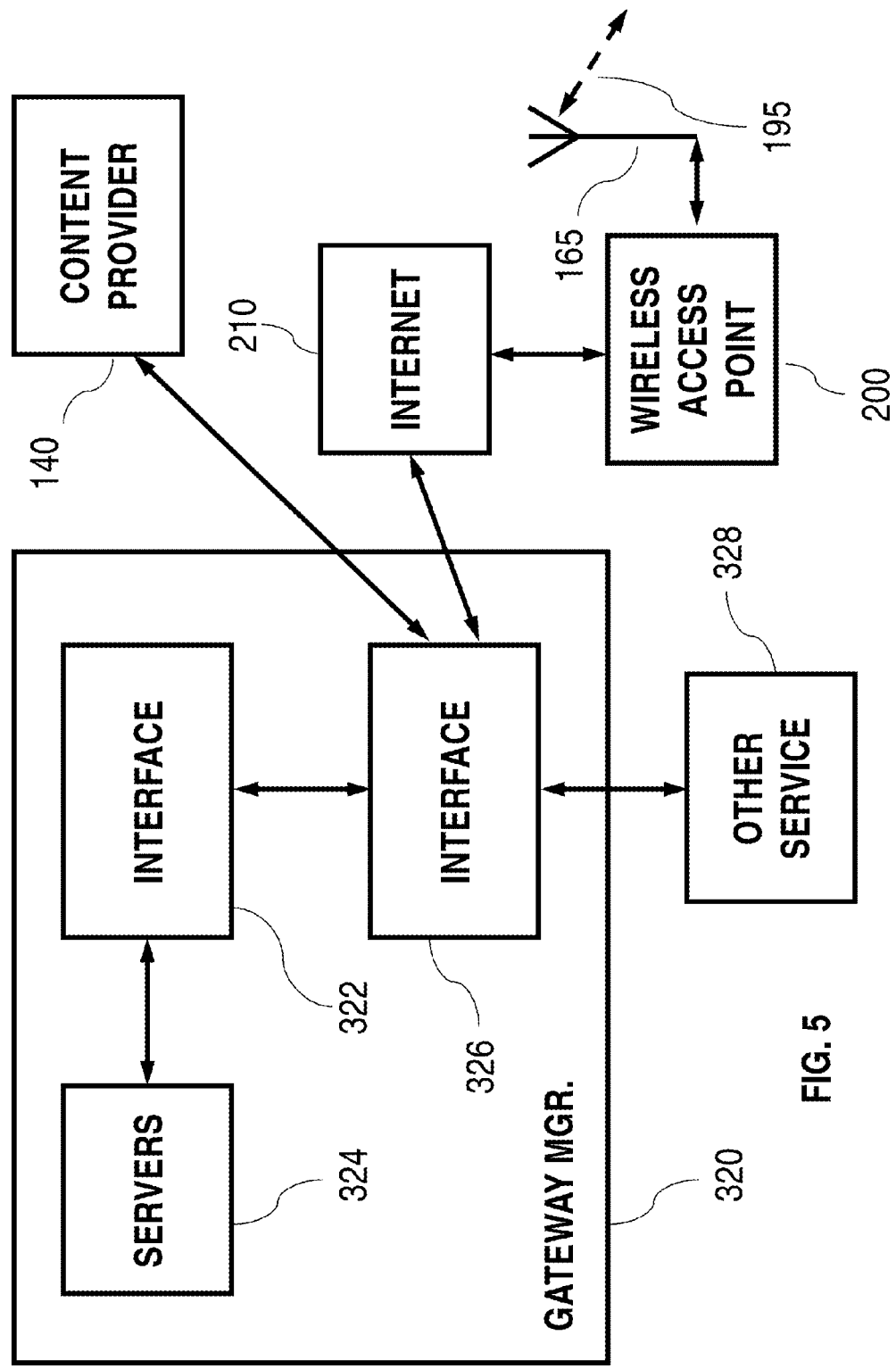
FIG. 5 shows a functional diagram of one embodiment of a gateway manager.

Referring now to FIG. 5, in some embodiments, gateway manager (320) may comprise one or more servers for storing, as examples, application programs and/or audio-visual programming to be relayed by wireless access point (200) to receiver (110), and /or user data relayed by wireless access point (200) from receiver (110) to content provider (140). Controller (322) may manage the operations of servers (324) and interface (326). Interface (326) may provide data routing and/or protocol conversion functions to allow data to be exchanged among content provider (140), servers (324) and the Internet. Interface (326) may also comprise interfaces to one or more other content providers/service managers (328) besides content provider (140).

Figure 6:
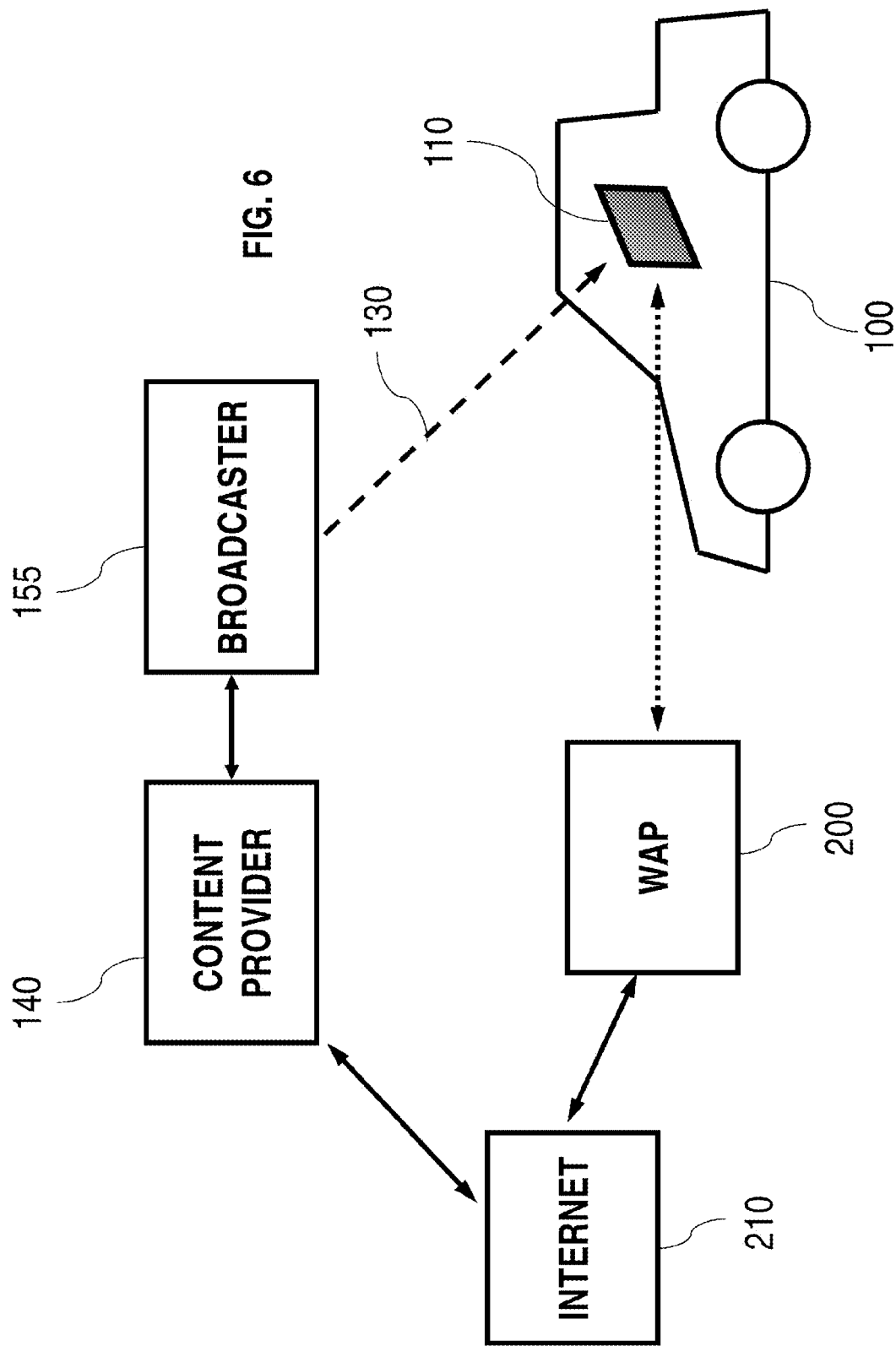
FIG. 6 shows a user-operated receiver in residence in a user-maintained motor vehicle.

In some embodiments, as shown in FIG. 6, the user-operated receiver resides in a user-maintained motor vehicle (100), which may be regularly in close proximity to wireless access point (200) (also called "WAP"). The ongoing return of the user-maintained motor vehicle (100) to the close proximity of wireless access point (200) allows the user-operated receiver to intercommunicate on an ongoing basis with the content provider by means of Internet connection (210).

Figure 7:
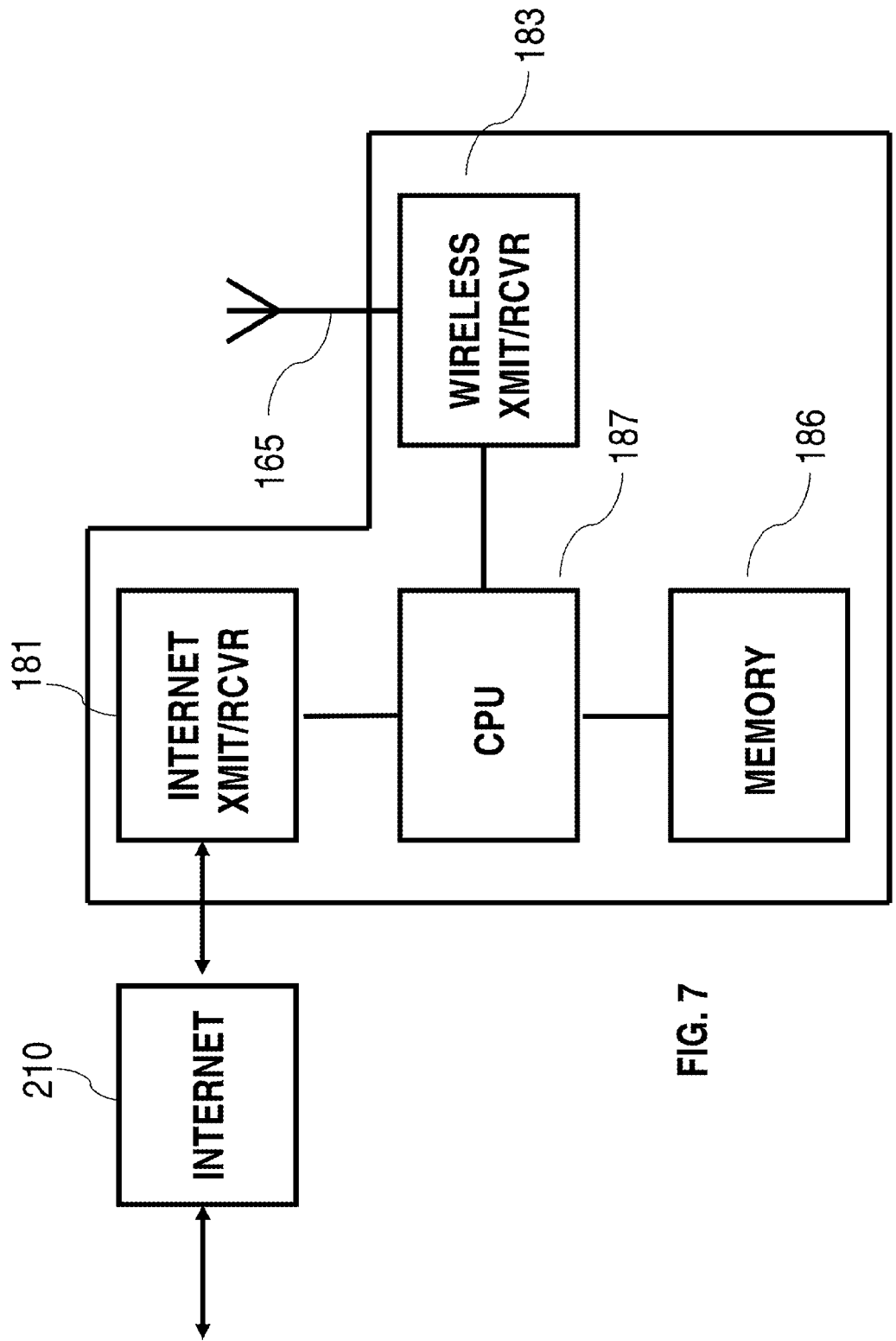
FIG. 7 shows one embodiment of a wireless access point.

Referring now to FIG. 7, in some embodiments wireless access point (200) may comprise an Internet interface (181) that may communicate with content provider (140), as described above with reference to the preceding figures, using Internet connection (210). Wireless access point (200) may also comprise a wireless transmitter/receiver (183) that may communicate with receiver (110), as described above with reference to FIG. 3, FIG. 4 and FIG. 6. Wireless transmitter/receiver (183) may, for example, comprise an IEEE 802.11 transmitter and/or IEEE 802.11 receiver and/or a Bluetooth transmitter and/or Bluetooth receiver. Wireless access point (200) may further comprise memory (186), which memory may further comprise solid-state memory and/or hard disk memory suitable for storing application programs and data. For example memory (186) may comprise a hard drive suitable for storing large amounts of audio/visual programming. Software and/or firmware executed by CPU (187) may manage the various functions (181), (183), (186), as well other functions (for example, a maintenance interface) that may comprise wireless access point (200).

Figure 8:
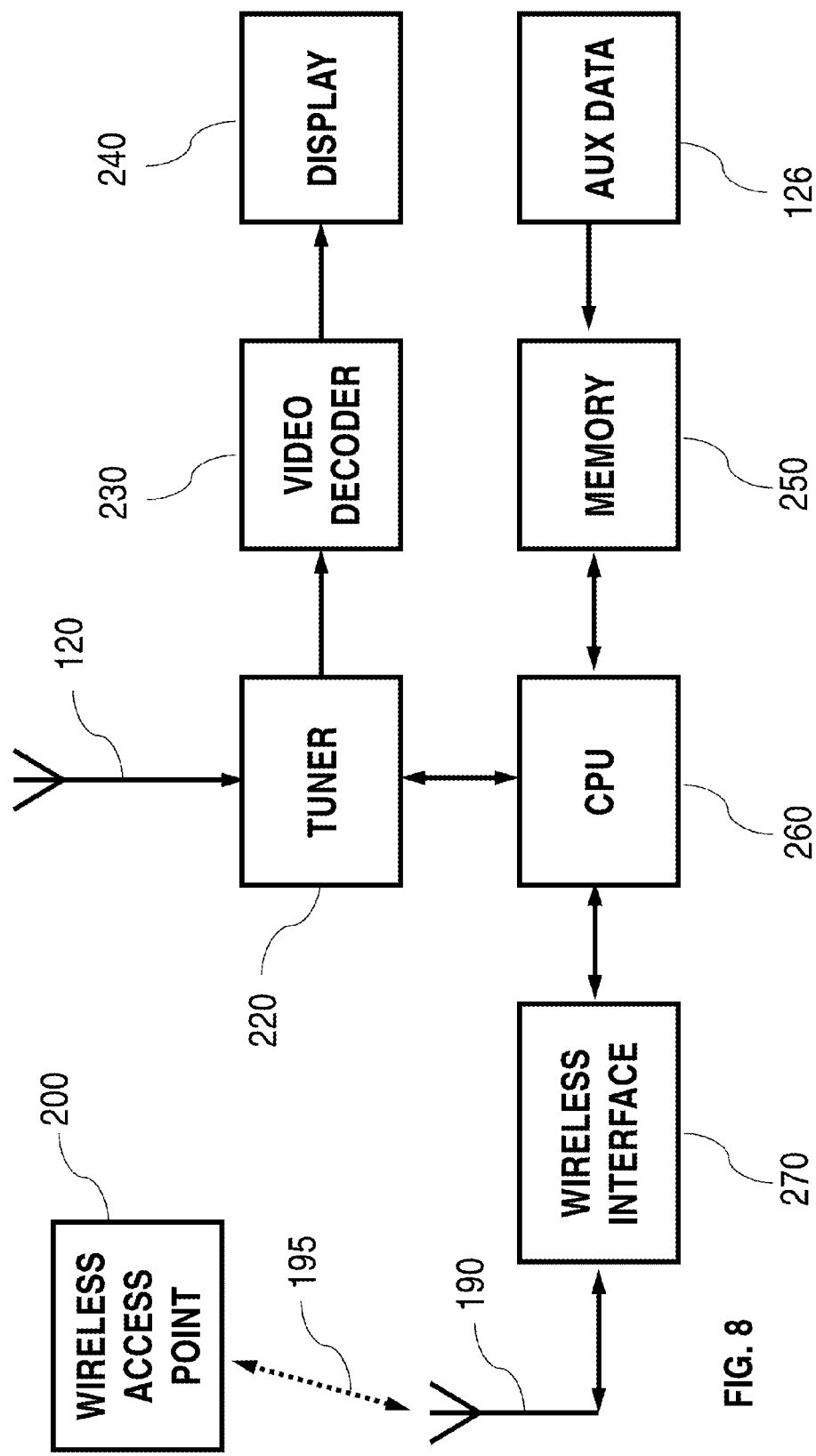
FIG. 8 shows one embodiment of a user-operated multimedia receiver.

The user-operated receiver may typically contain a tuner (220), as shown in FIG. 8, with which to select over-the-air broadcasts, and a video decoder (230) and video display (240) with which to reproduce audio-visual programming. The user-operated receiver may maintain information in a non-volatile memory (250). This information may include a combination of user-supplied input and broadcaster-supplied data and other applications that may execute within the user-operated receiver. User supplied input may be input using, for example a keyboard, touch-sensitive screen, or voice input device (not shown in FIG. 6) associated with receiver (110) and managed by CPU (240). CPU (240) may process user supplied input before storing it in memory (250). For example, CPU (240) may run speech-recognition software to convert digitized speech from a voice input device representing a user program selection to a digital data representation of the program selection before storing the digital data representation in a database of program selections stored in memory (250). The information about program selections may be used, in some embodiments, to provide personalized functionality to the user-operated receiver. CPU (260) may handle the data transactions, and send and receive data to and from the wireless access point by means of a wireless interface (270) and antenna (190). In some embodiments, the wireless interface may use one of the standard IEEE 802.11 wireless local area network (WLAN) communication protocols.

Figure 9:
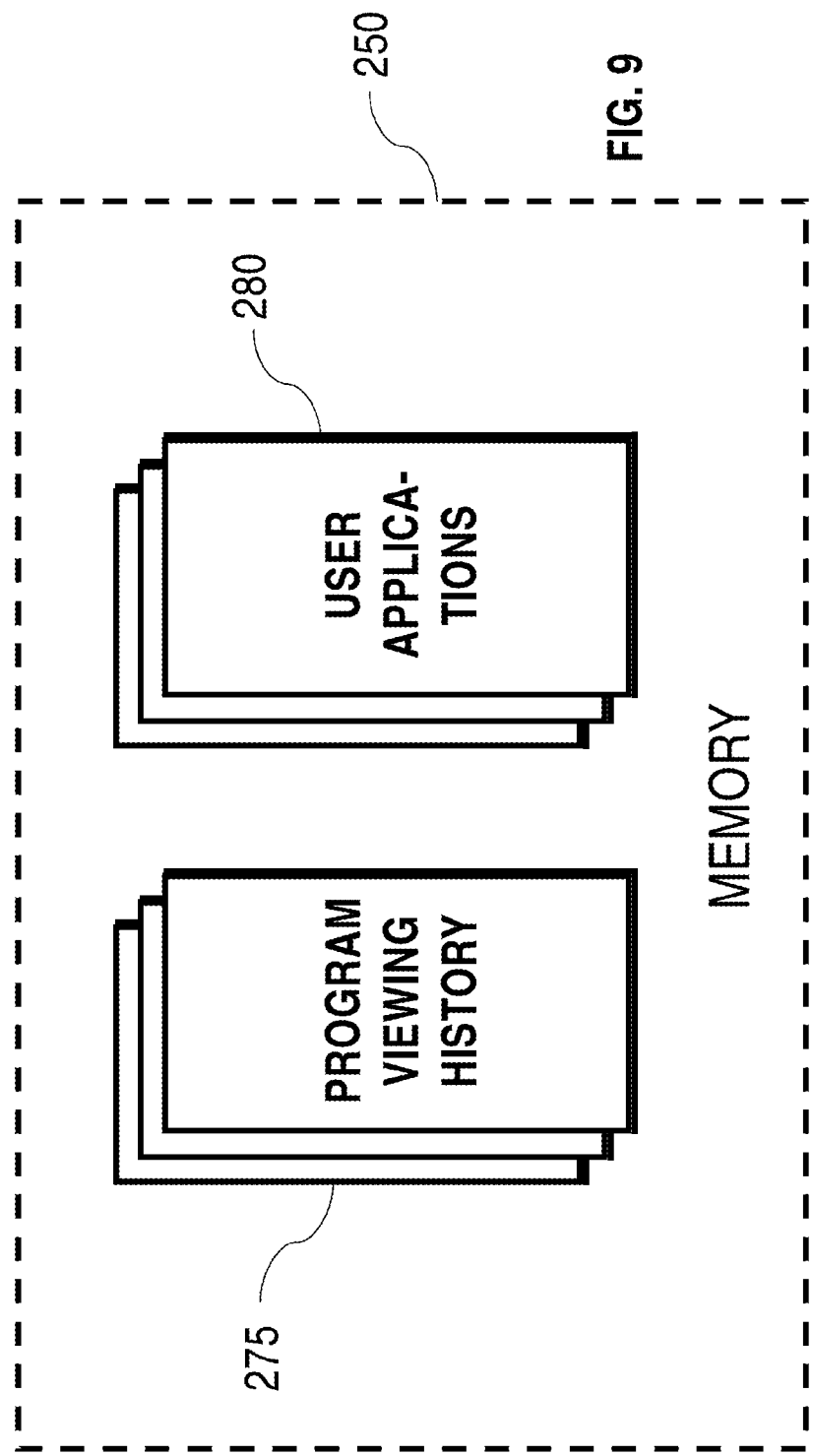
FIG. 9 shows an embodiment of non-volatile memory for storing application programs and/or the program viewing history of one or more users.
Figure 10:
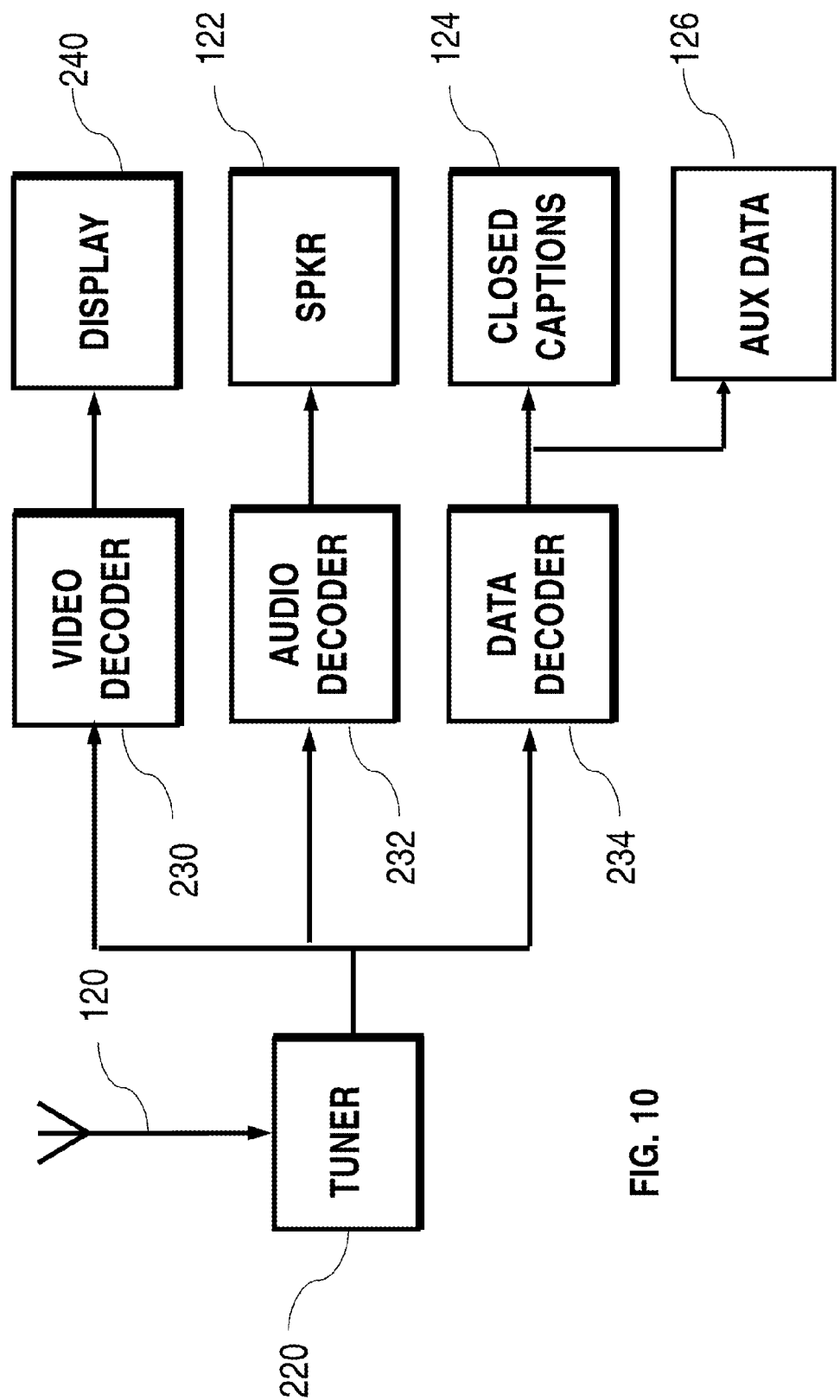
FIG. 10 shows a partial embodiment of a user-operated multimedia receiver.

The user-operated receiver (110) non-volatile memory may contain various types of user specific information, as shown in FIG. 9, such as a history of the user's program viewing (275), as well as multiple user applications (280). User applications (280) may be pre-stored in receiver (110) at the factory where receiver (110) is manufactured. User applications may also be downloaded and stored into memory (250) using the wireless interface (270), as shown in FIG. 8, and/or, as shown in FIG. 10, as auxiliary data (126) output by a data decoder (234), that decodes data received using tuner (220). For example, the signal received by tuner (220) may comprise an MPEG transport stream containing not only audio-visual data, but also data representing user application programs. The output of tuner (220) may be demultiplexed into video data, audio data, and auxiliary data. Demultiplexed video data may be decoded by video decoder (230) and sent to display (240) Audio data may be decoded by audio decoder (232) and sent to speaker (122) or headphones. Auxiliary data (126), which may in some embodiments comprise application programs, may be sent to memory (250), as shown in FIG. 8, for storage as applications data (280). Demultiplexed auxiliary data may be stored directly into memory (250) by a Direct Memory Access (DMA) controller function (not shown in FIG. 8), the design of which is well known to those of normal skill in the digital design arts. Alternatively, auxiliary data may be sent to CPU (260) and CPU (260) may then store the auxiliary data in memory (250).

Figure 11:
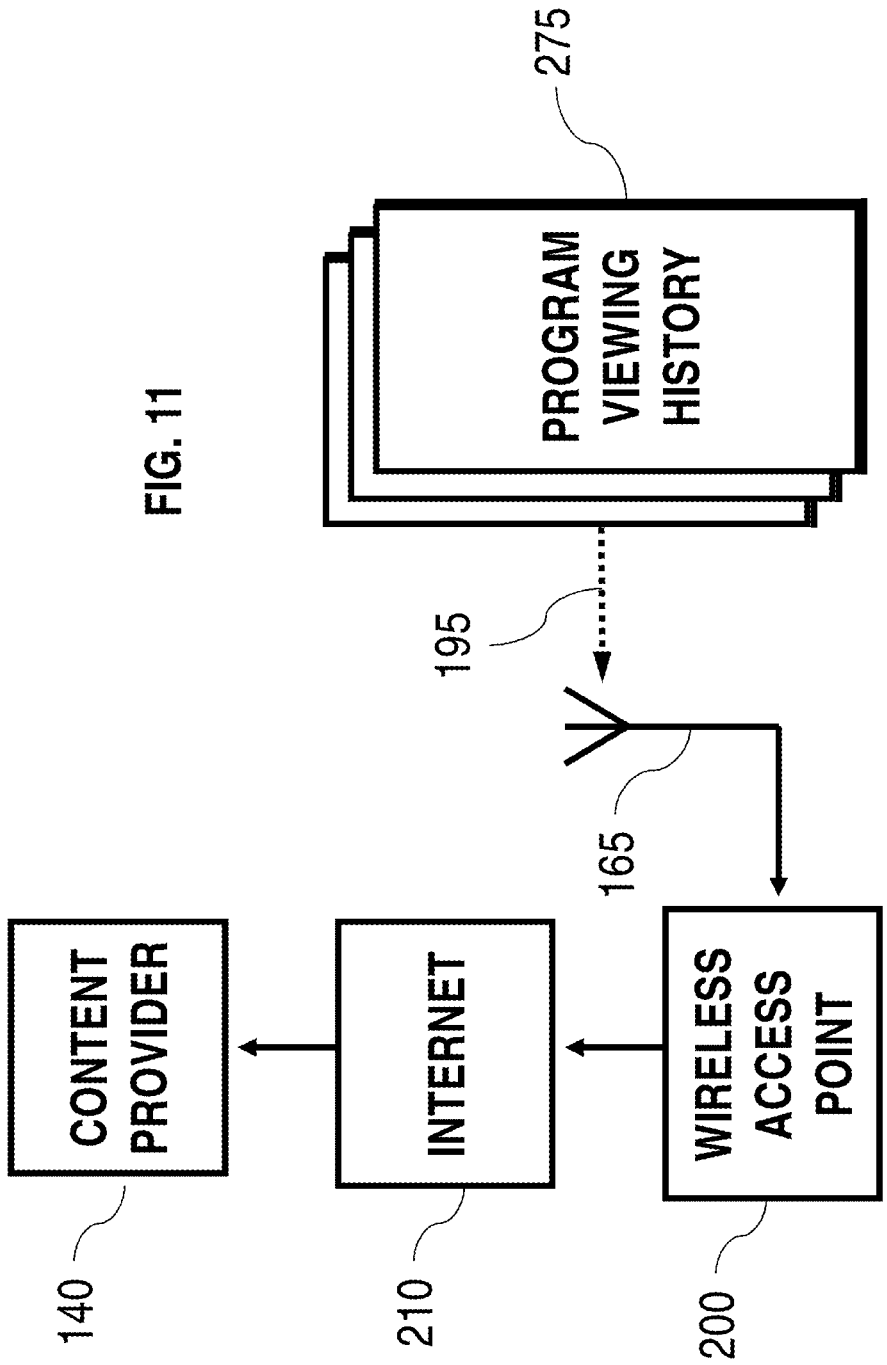
FIG. 11 shows an embodiment of transmitting program viewing history to a content provider using a wireless access point as a relay.

Program viewing history (275) may be sent to the content provider, as shown in FIG. 11, for example, so that the content provider can aggregate statistical information on program viewing behavior of multiple users. For example, a representation of the program viewing history (275) may be retrieved from memory (250) by CPU (260) and sent to content provider (140) using wireless interface (270). Program viewing information may be gathered automatically, or upon explicit request.

Program viewing history (275) may be explicitly sent to content provider (140) following a request from content provider (140) relayed to receiver (110) by wireless access point (200). Upon receiving the request, CPU (260) may then retrieve the program viewing history (275) data from memory (250) and send it to content provider (140) using wireless interface (270).

For example, program viewing information may be automatically (without explicit request from content provider (140) or user intervention) sent to content provider (140) during or after each program is viewed at receiver (110), if wireless connection (195) is available, in which case program viewing history (275) may be stored only briefly, or not at all, in memory (250), or alternatively, after some number of programs are viewed, according to the availability of wireless connection (195).

Referring again to FIG. 9, the user applications (280) may be specific to each user-operated receiver (110), or of a common type that can be used by a multitude of different user-operated receivers. One example of such a user application (280) is a user-interface application that provides a method to present data to the user and to provide user input to the user-operated receiver (110).

The program viewing history (275) and the user applications (280) may also modify the manner in which the user-operated receiver functions. One such method of functional modification is to download new operating system software, software components, APIs, etc. to the user-operated receiver.

Personalized functionality may be provided to receiver (110), for example, by downloading new applications (280) into memory (250) based upon the pre-download set of applications (280) and the program viewing history (275). For example the program viewing history (275) may indicate that the user may benefit from an update to an existing user interface application (280), which update includes better support for interactive features of programs previously viewed, and a download request may be queued to acquire the update from content provider (140) via wireless access point (200) according to the availability of wireless connection (195) and Internet connection (210).

Figure 12:
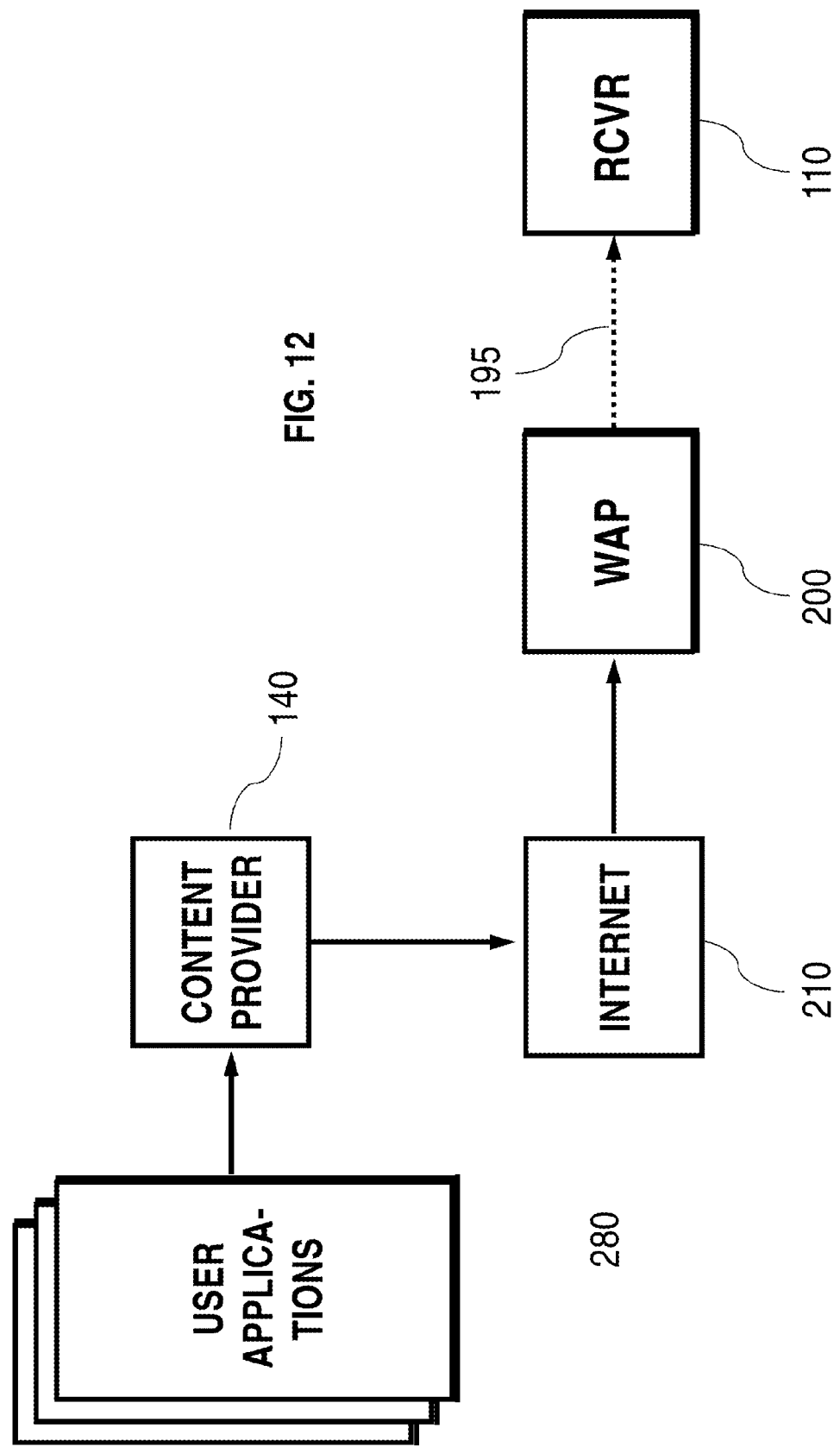
FIG. 12 shows user applications being sent by a content provider to a user operated receiver by means of an Internet connection and a wireless access point.

Referring now to FIG. 12, user applications (280) may be sent by the content provider to the user operated receiver (110) by means of the Internet connection (210) and the wireless access point (200). Alternatively or alternately, the user applications (280) can be sent by the content provider to the user operated receiver (110) by other means, such as by over-the-air transmission (130).

Figure 13:
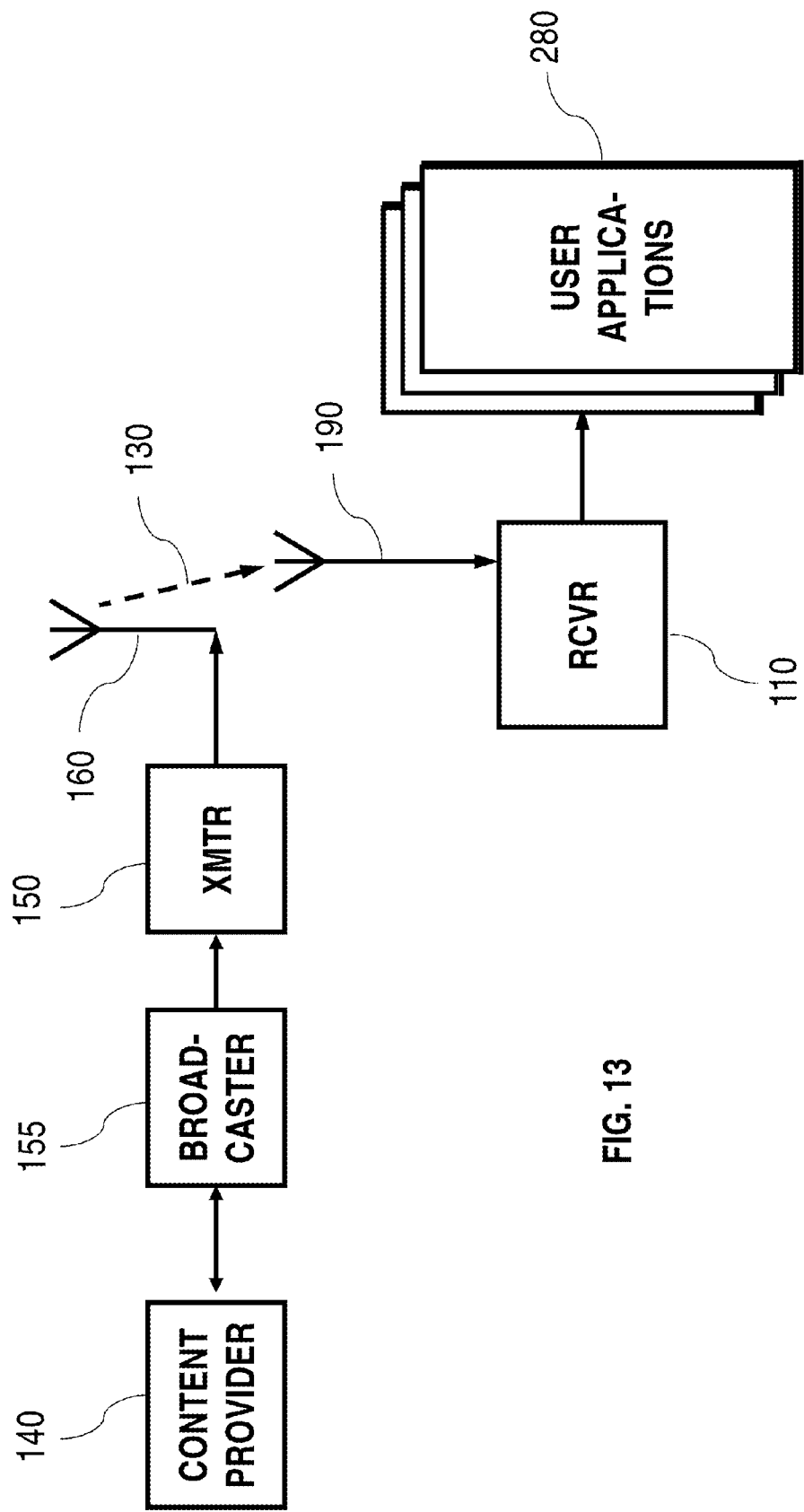
FIG. 13 shows an embodiment of transmitting an application program from a content provider to a user-operated multimedia receiver using an off-air broadcast network.

User applications (280) may be sent to the user-operated receiver by means of the wireless network, using wireless connection (195) and Internet connection (210) as shown in FIG. 12, or alternatively, using over the over-the-air transmission (130), as shown in FIG. 13. A combination of the two download mechanisms is also possible. For example, one or the other of the connections (195) and (130) may be unavailable at any given time, for example due to non-proximity of vehicle (100) to wireless access point (200), in the case of connection (195), and a download partially completed using one of the two connections (195) and (130) may be completed by using the other of the connections (130) and (195). In another example, one of the connections (195) and (130) may carry a higher monetary charge to the user's account for downloading, and the content provider may choose the lower cost connection to minimize the charge to the user at any given time. Many wireless devices (110), for example car navigation systems, include means for determining their geographic location, such as GPS devices. Means of determining locations of wireless transmitters based on comparing signal strengths of wireless transmitter signals received at multiple reception sites, such as a number of proximate wireless access points (200), are also well known. The content provider may interrogate, for example, the receiver (110), and/or one or more ISPs that support any number of wireless access points (200) to determine the location of receiver (110) and/or one or more wireless access points (200) proximate to receiver (110). The content provider may then choose to use the lower cost connection of either (195) or (130) for the download, based on, for example, locally applicable charges of the ISPs and broadcast transmitter (150) operator.

Figure 14:
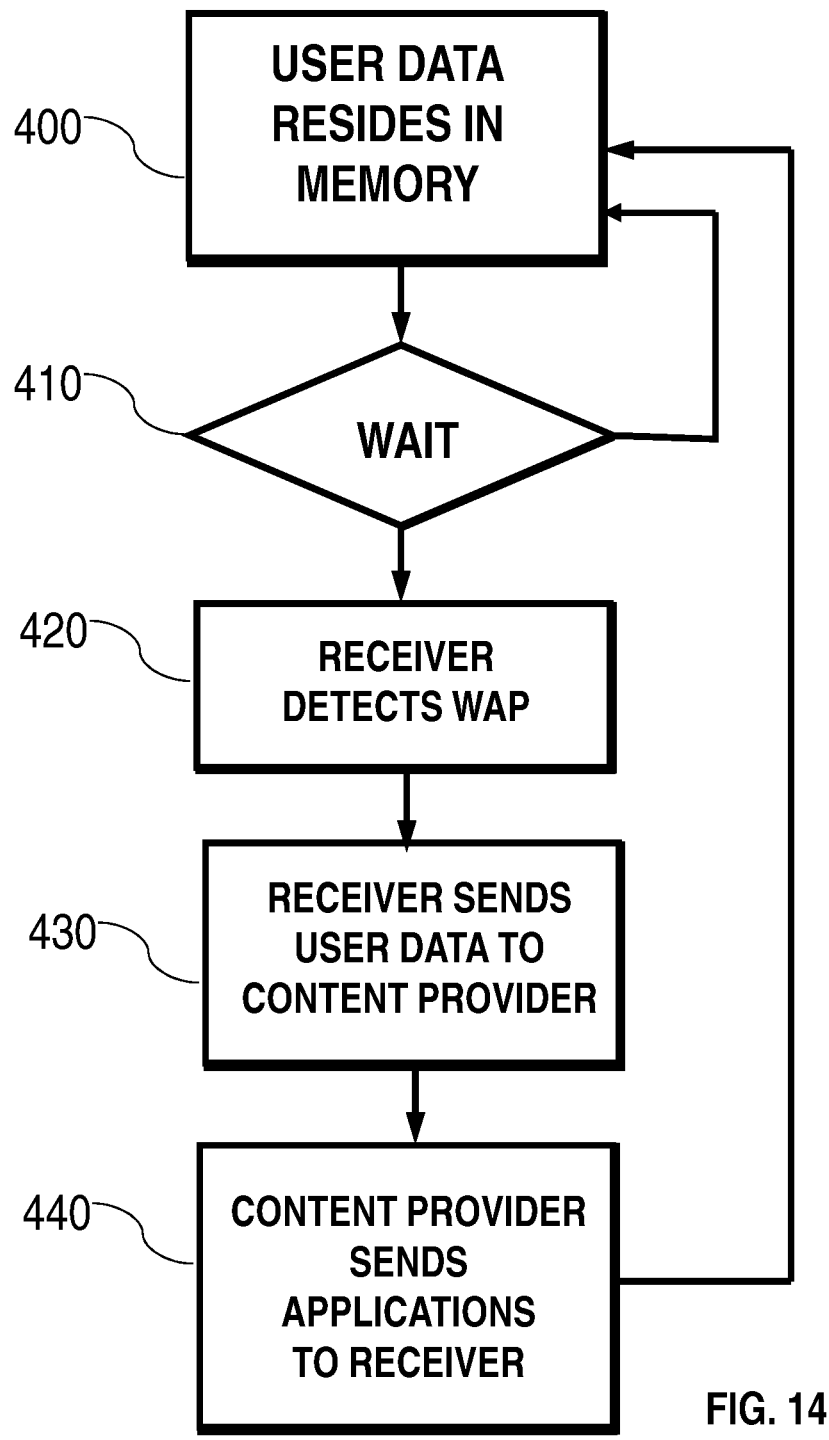
FIG. 14 shows a flow chart of an embodiment of opportunistically sending user data to a content provider and/or receiving applications from a content provider.

The software that supports the functionality of this invention may similarly describe the invention, and some or all of the described features may be realized in software and/or hardware. One such embodiment is shown in FIG. 14. User data is managed in the user-operated receiver (110), and resides (400) in a non-volatile memory e.g., (250). The software program waits (410) until the user-operated receiver (110) detects (420) the close proximity of the user-maintained wireless access point (200). If the user-operated receiver has user data to send, the user-operated receiver may then send (430) the user data to the content provider (140) by means of the user-maintained wireless access point and the Internet connection (210). If the content provider (140) has application or other data to send, the content provider may then take advantage of this connection to send (440) applications to the user-operated receiver (110), which may customize the operation of the particular user-operated receiver. These applications may then reside in the non-volatile memory, and execute as needed. The software program may then wait until the next time that the user-operated receiver (110) detects the close proximity of the user maintained wireless access point (200).

Figure 15:
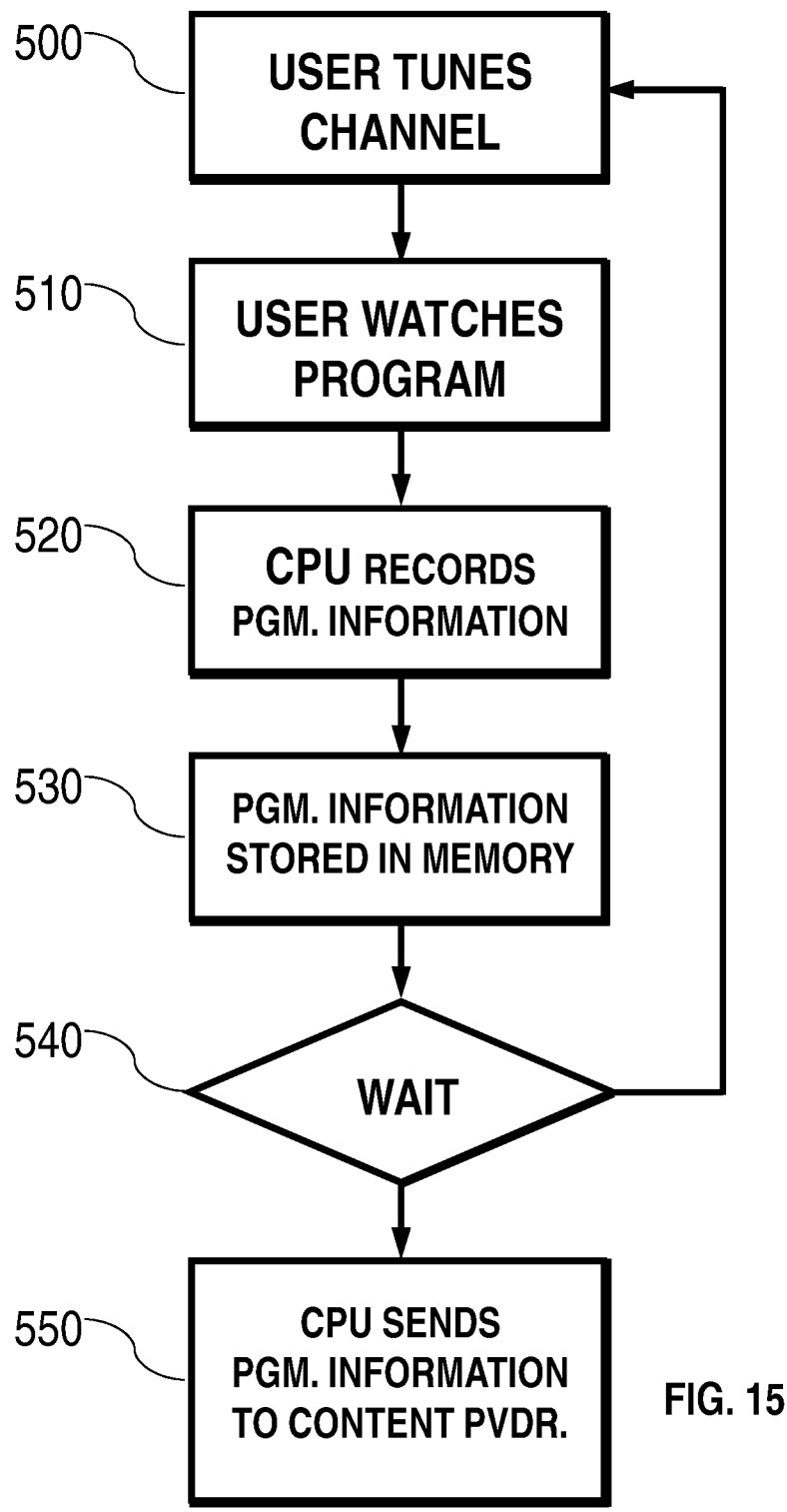
FIG. 15 shows a flow chart of an embodiment of capturing program viewing history and transmitting the viewing history to a content provider.

An embodiment of downloading program viewing information is shown in FIG. 15. The user tunes (500) a channel, for example using tuner (220) to watch (510) a desired program. The CPU (260) records (520) this activity, wherein such data can include the channel identification, program name, time of program consumption, and/or similar information. This data may then be stored (530) in memory (250), for future retrieval. The receiver (110) may then wait (540) and repeat this process for a predetermined length of time. After the predetermined length of time has expired, and the receiver (110) is or becomes proximate to a wireless access point (200), the CPU (260) may send (550) a history of the receiver program information (275) to the content provider (140). The predetermined length of time may be adjusted to provide a compromise between the timely relay of the information and a minimization of wireless connection (195) network access for the return path. Wireless connection (195) access charges may vary according to packet size, geographic location of the receiver (110), and time of day, among other possible factors. For example, CPU 260 may wait (440) until it has accumulated enough program viewing information (275) to populate an integral number of IEEE 802.11 packets before sending (550) the information (275) to the content provider.

In an alternative embodiment, also shown in FIG. 6, the user-operated receiver (110) is sporadically in close proximity to a wireless access point (200) that is not maintained by the user. The occasional positioning of the vehicle and user operated receiver (110) to the close proximity of the wireless access point (200) that is not maintained by the user allows the user-operated receiver (110) to intercommunicate on a sporadic basis with the content provider (140) by means of the Internet connection (210).

In another alternative embodiment, also as shown in FIG. 6, the user-operated receiver may regularly be in close proximity to a non-user-maintained wireless access point (200). The ongoing return of the vehicle and user-operated receiver to the close proximity of the wireless access point (200) allows the user-operated receiver (110) to intercommunicate on an ongoing basis with the content provider by means of the Internet connection (210).

Figure 16:
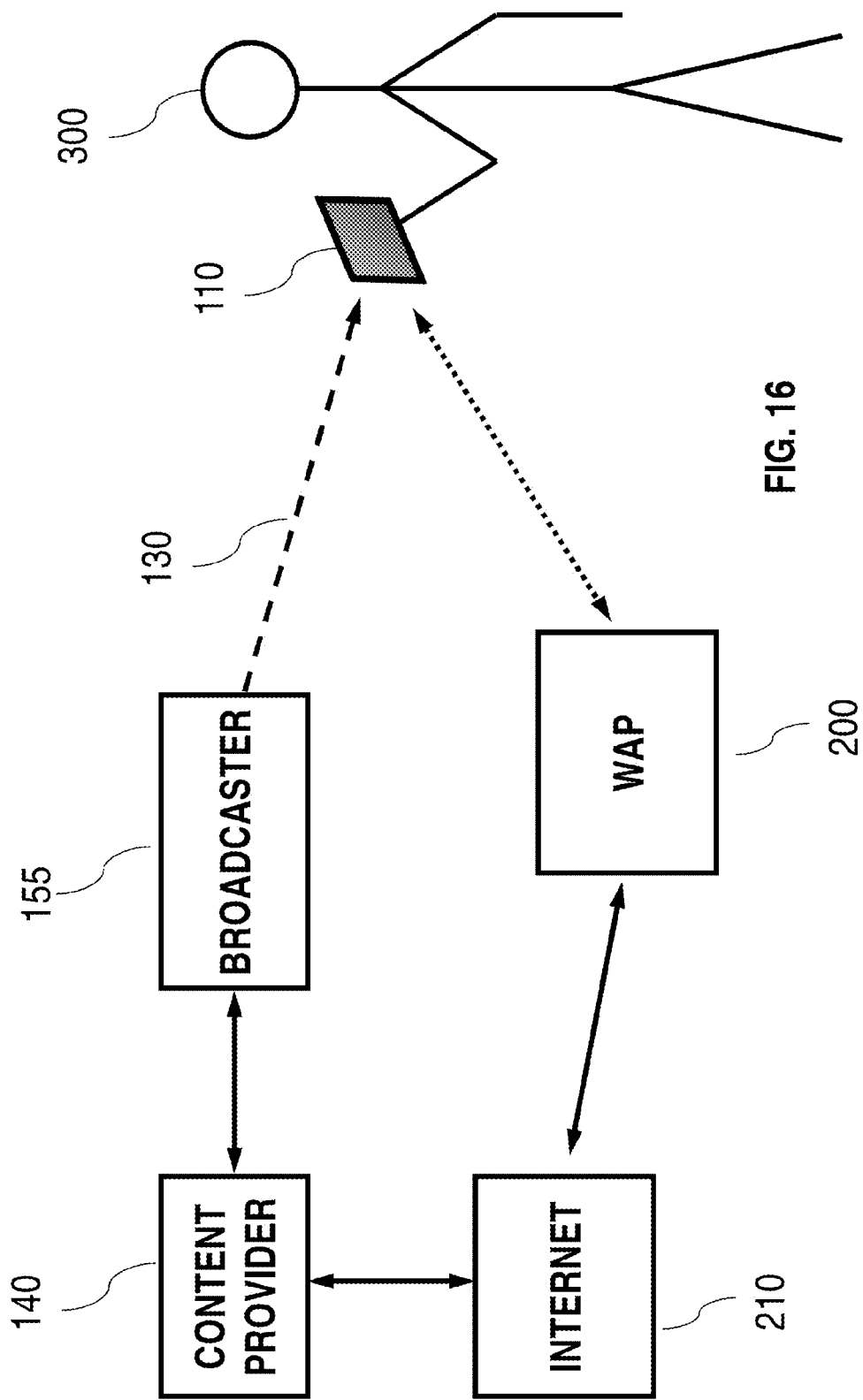
FIG. 16 shows an embodiment wherein a user-operated receiver is carried by a pedestrian user.

In another alternative embodiment, as shown in FIG. 16, the user-operated receiver may be carried by a pedestrian user (300) who is regularly in close proximity to a user maintained or non-user-maintained wireless access point (200). The ongoing return of the user and user-operated receiver to the close proximity of the user-maintained or non-user-maintained wireless access point (200) allows the user-operated receiver (110) to intercommunicate on an ongoing basis with the content provider by means of the Internet connection (210).

In another alternative embodiment, also as shown in FIG. 16, the user-operated receiver (110) is carried by a pedestrian user (300) who is sporadically in close proximity to a wireless access point (200) that is not maintained by the user. The occasional positioning of the user and user operated receiver (110) to the close proximity of the wireless access point (200) that is not maintained by the user allows the user-operated receiver (110) to intercommunicate on a sporadic basis with the content provider (140) by means of the Internet connection (210).

The user-operated receiver (110) including display unit (240) may, in some embodiments, also be described as a mobile TV.

The user-operated receiver (110) including display (240) may alternatively be realized by an appropriately equipped portable computer system, such as a laptop PC equipped with both an over-the-air TV tuner and a short-range wireless connection. The over-the-air tuner and short-range wireless radio may be integrated into the PC, or alternatively maybe provided as plug-in devices. The user-operated receiver and display may be realized by other appropriately equipped portable systems, such as tablet computers, "netbooks," and other hybrid devices of arbitrary size.

The user-operated receiver (110) including display (240) may be realized by a permanently or removably affixed system in an automobile or other vehicle.

The display (240) used to render video images may be any one of a number of different display types, such as those constructed from alternative materials, bendable screens, and projection devices.

The audio-visual decoder, for example video decoder (230), audio decoder (232), display (240), and speaker (122) may be replaced with other types of processing and user entertainment devices, such as an audio-only decoder and sound reproduction apparatus.

The receiver (110) can process digital data that can also include other services that are supplied to the user, such as closed captions (124).

The wireless access point device (200) used to relay information may conform to, as alternatives to IEEE 802.11, other standards, for example, Bluetooth, IRDA, 3G cellular, and the like.

The various antennas described herein, for example (120) and (190), may, in some embodiments be replaced with any of various other radio-frequency (RF) transducers, such as printed-circuit antennas.

Figure 17:
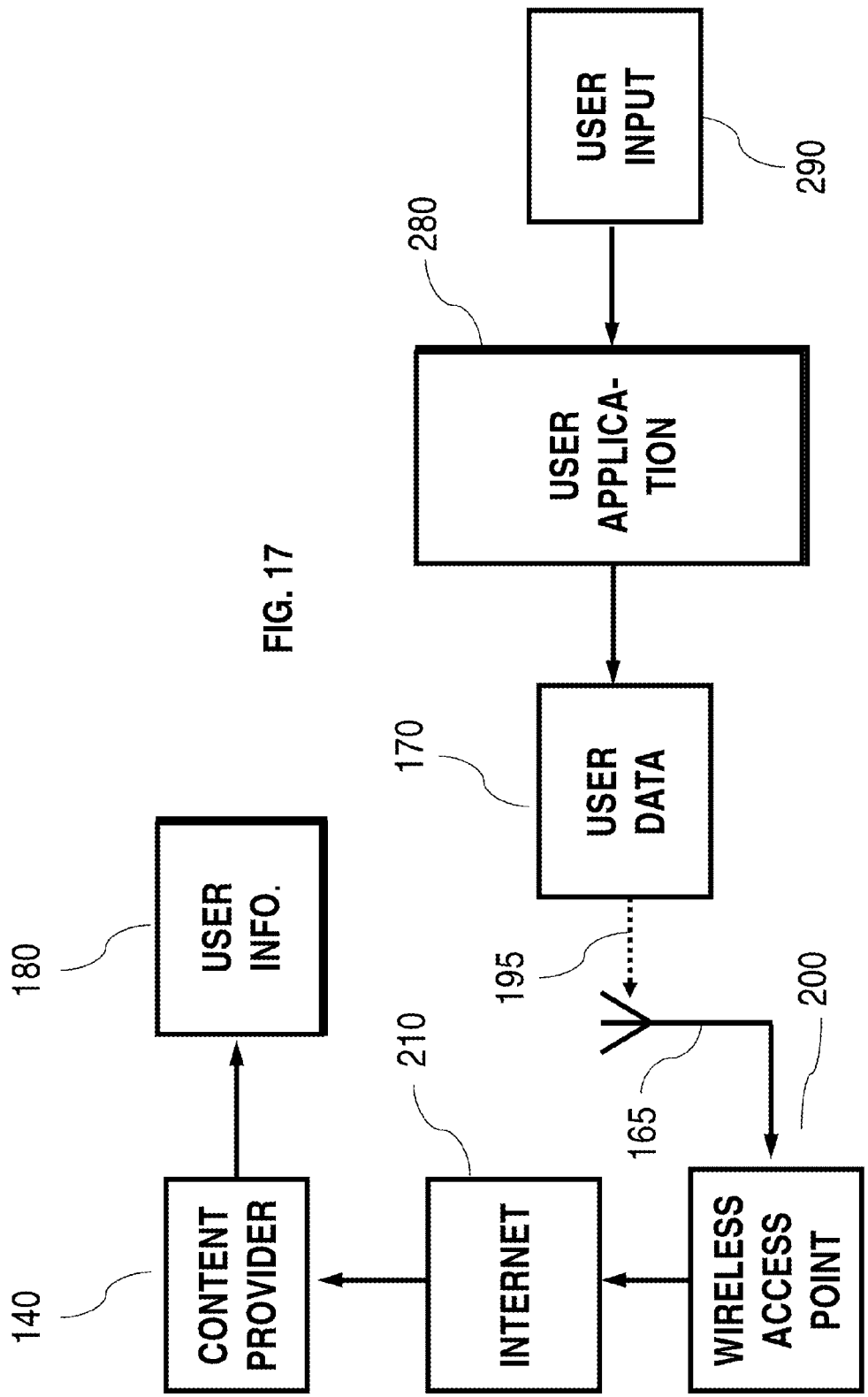
FIG. 17 shows an embodiment of receiving user input by a multimedia receiver and transmitting the user input to a content provider using a wireless access point as a relay.

The user may input data directly into the receiver (290), and that data (170), in turn, can be relayed to the content provider, which can maintain and process the user information (180), as shown in FIG. 17. This data entry can be facilitated by means of an on-screen graphical user interface, using, for example, display (240)

In order to protect the privacy of the users, some or all of the directly-input user data (290) may remain resident in the user-operated receiver (110), according to the user's preferences.

The content provider may comprise multiple entities that are not co-located. For example, the content provider may comprise one or more non-co-located broadcast entities.

The program viewing statistics may be aggregated at receiver (110), wireless access point device (200), or gateway manager (320), to minimize transmission time and/or bandwidth and/or cost. For example, viewing information may be transmitted from receiver (110) to gateway manager (320) after each program is viewed. Processing at gateway manager (320) may reduce the raw viewing information to a smaller amount of information such as statistics only. As a simple example, if a program is viewed more than once, it may not be necessary to transmit all of the information describing the program to the content provider; only the program title and a count of the number of viewings of that program may be transmitted to the content provider.

A program guide may be transmitted from the content provider to gateway manager (320) or wireless access point (200), and the program guide may be accessed by receiver (110) using a simplified user interface. This may minimize storage and/or processing power requirements at receiver (110). For example only a subset of the program guide information may need to be accessed at receiver (110) at any given time.

A program guide transmitted to receiver (110) and/or wireless access point (200) may be based on the location of the receiver or wireless device. Receiver (110) or wireless access point (200) may transmit its location, for example its GPS coordinates, to the content provider, and the content provider may then transmit a program guide appropriate to the location of receiver (110) or wireless access point device (200) to receiver (110) or wireless access point (200). Alternatively, information describing one or more programs currently or recently received by receiver (110) may be transmitted to the content provider and the content provider may then consult a database to determine other programs that may be receivable based on the programs already received. An appropriate program guide containing these potentially-receivable programs may then be transmitted to receiver (110) and/or wireless access point (200) by the content provider.

Wireless access point (200) or gateway manager (320) may run a web browser that may be accessed by a simplified user interface from receiver (110). Interactive video programs may use a web page for interaction, and running the web browser on wireless access point (200) or gateway manager (320) may save processing power at receiver (110).

Receiver (110) or wireless access point (200) may notify the content provider of intermittent loss of reception of a program. The content provider may provide that program to receiver (110), using connection (195), during the periods of reception loss. Alternatively, the content provider may provide a summary of the program during periods of reception loss. The summary may comprise video clips and/or audio, and/or text. A delay may be interposed in the video broadcast over connection (130) to accommodate delay in generating the summary.

Wireless access point (200) or gateway manager (320) or content provider (140) may provide an audio-visual programming storage and replay function for receiver (110). Programming data may be transmitted to and received from wireless access point (200) using wireless connection (195). For example, wireless access point (200) may include a large hard drive or flash memory to store the programming data. This may save processing power, battery life, storage space and device cost of receiver (110).

Figure 18:
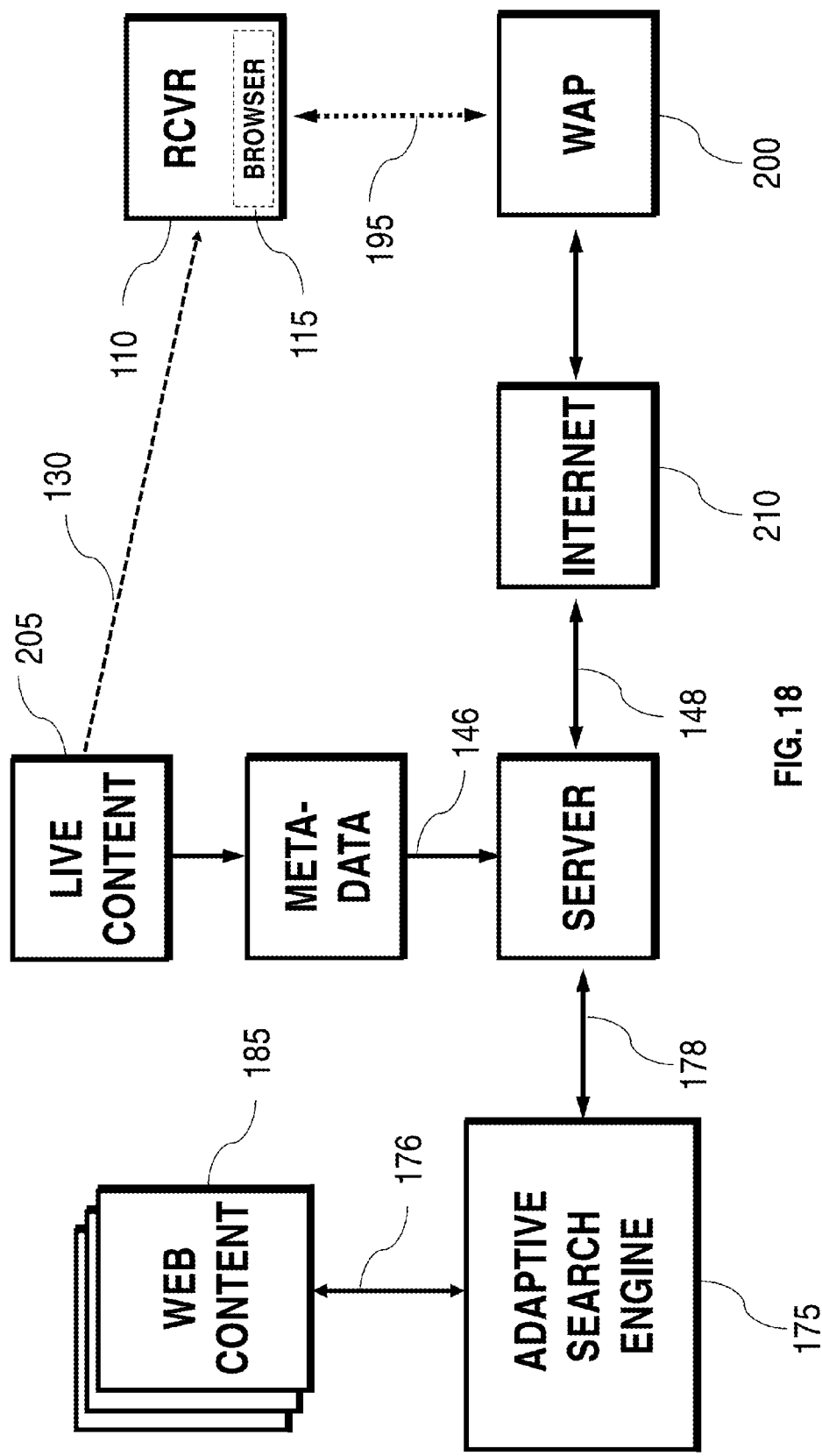
FIG. 18 shows an embodiment of browsing web content stored on a remote server by a mobile receiver.

In some embodiments, as shown in FIG. 18, mobile user-operated receiver (110) may contain a browser (115) with which the user can browse and view web content (185) downloaded from a remote content server (145), which server (145) may comprise, for example, one or more of servers (324) of FIG. 5. The mobile user-operated receiver (110) may be intermittently in communication with a wireless access point (or "WAP") (200) that is connected to the internet (210). The remote content server may use an adaptive search engine (175) to pre-select web content according to metadata that may be generated from several sources, for example the metadata used by adaptive search engine (175) may be generated from the live content (205) itself, as shown in FIG. 17, and/or the metadata may be generated from the user's program viewing history (e.g., 275 of FIG. 9), as described in more detail in the following. Live content (205), for example, real-time broadcasts of television programs, may be tagged with its associated metadata (215), and metadata (215) may be stored in memory associated with server (145).

In some embodiments, server (145) may comprise a communication interface (146), of any of a number of types known in the art, for receiving metadata (215) from a provider, for example from a content provider, and/or a manager, and/or a broadcaster and/or the operator of the over-the air transmitter. In some embodiments, metadata (215) may be generated from live content (205) by a process running on server (145), and in such embodiments the interface (146) used by server (145) to receive metadata (215) may comprise a software interface. In some embodiments, server (145) may also comprise a communications interface (148) for receiving information related to the program viewing history (e.g., 275 of FIG. 9) of the user of the mobile device from internet (210) via WAP (200).

In some embodiments, metadata (215) may be used by adaptive search engine (175) to retrieve web content (185) related to the interests of the user of mobile device (110). For example, the user's program viewing history (e.g., 275 of FIG. 9), may be sent to, and stored in memory associated with, server (145), as described in the preceding with reference to FIG. 15, from mobile device (110) via connection (195) and WAP (200). Metadata (215) may be generated from live content (205) before the transmission of live content (205) to mobile receiver (110) via connection (130). Adaptive search engine (175) may search for and retrieve web content (185) related to the user's interests, as represented by the subset of metadata (215) associated with programs previously viewed by the user. Web content (185) related to the user's interests may be stored in memory associated with server (145) until such time as a connection to browser (115) is available via WAP (200). For example, if the user is interested in football, as indicated by football appearing in the metadata of their program viewing history, then adaptive search engine (175) may retrieve football-related web content and store it on server (145). When a connection is available via WAP (200), the user may browse the web content (185) retrieved by adaptive search engine (175).

In some embodiments adaptive search engine (175) may comprise a communication interface (176), of any of a number of types known in the art, for receiving web content (185), for example, from an Internet Service provider (ISP). In some embodiments, adaptive search engine (175) may also comprise a communications interface (178) for sending retrieved web content to a memory associated with server (145). In some embodiments, interface (176) and/or (178) may comprise a software interface, for example in embodiments wherein adaptive search engine (175) may be running on a processor associated with server (145) and server (145) may provide the lower level physical interface to an ISP for receiving web content (185), interface (178) may comprise a software interface.

Figure 19:
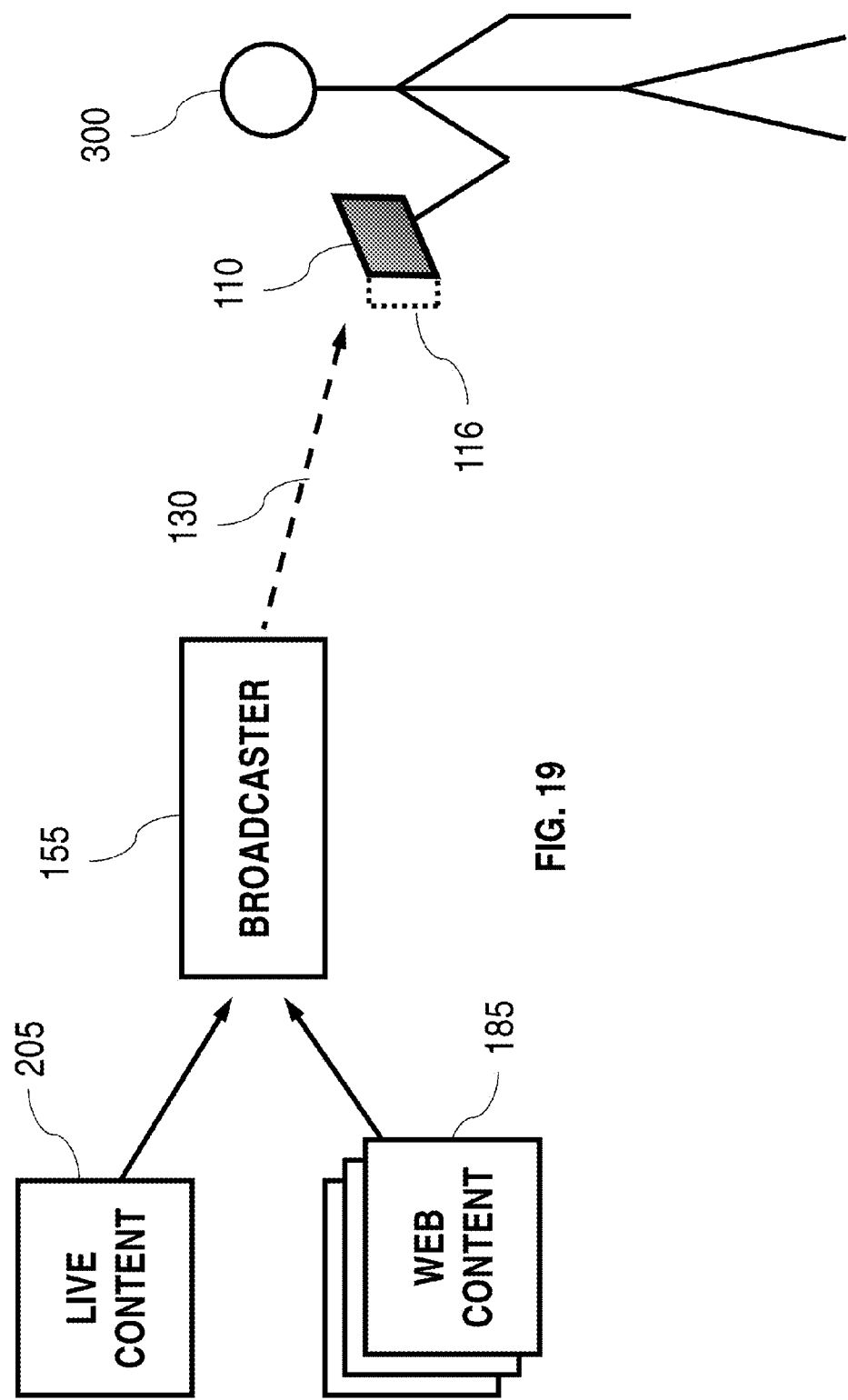
FIG. 19 shows an embodiment wherein a pedestrian user receives both live content and web content over-the-air.
Figure 20:
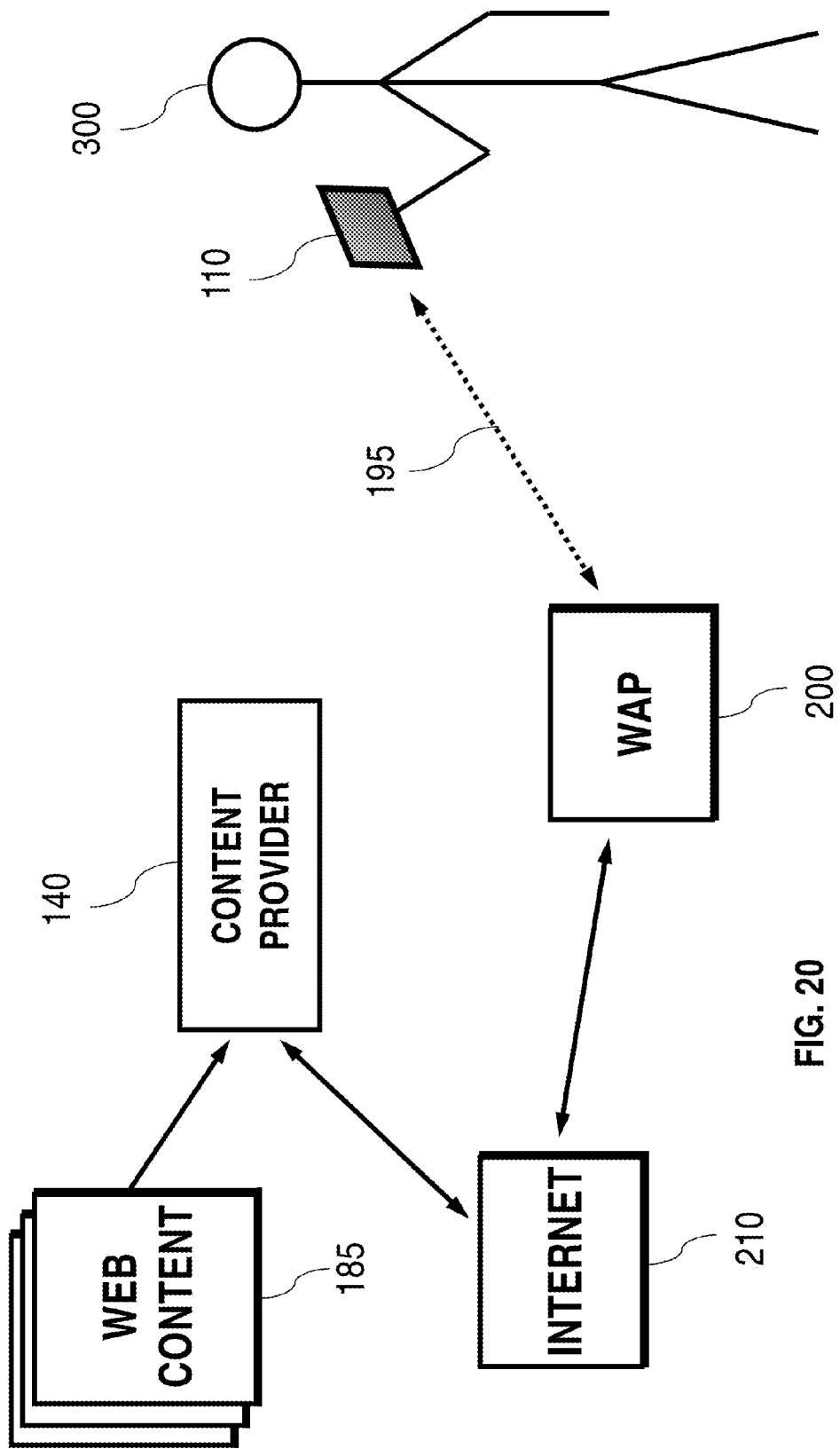
FIG. 20 shows an embodiment wherein a pedestrian user receives web content from a wireless access point.

In one embodiment, as illustrated in FIG. 19, mobile user-operated receiver (110) may make available to a pedestrian user (300) both live content (205) and web content (185) that are provided by a broadcaster (155). The live content may be sent by means of an over-the-air transmission (130). The web content (185) may not be continuously received, and may be stored in a non-volatile memory (116), which may in some embodiments comprise non-volatile memory (250) of FIG. 9, so that it can be retrieved later. In this fashion, the user can browse a selection of web content even when mobile user-operated receiver (110) is not in communication with wireless access point (200). Web content (185) may be sent by means of over-the-air transmission (130), or by means of wireless access point (200) as shown in FIG. 20, or by means of a combination of both as shown in FIG. 21.

Figure 21:
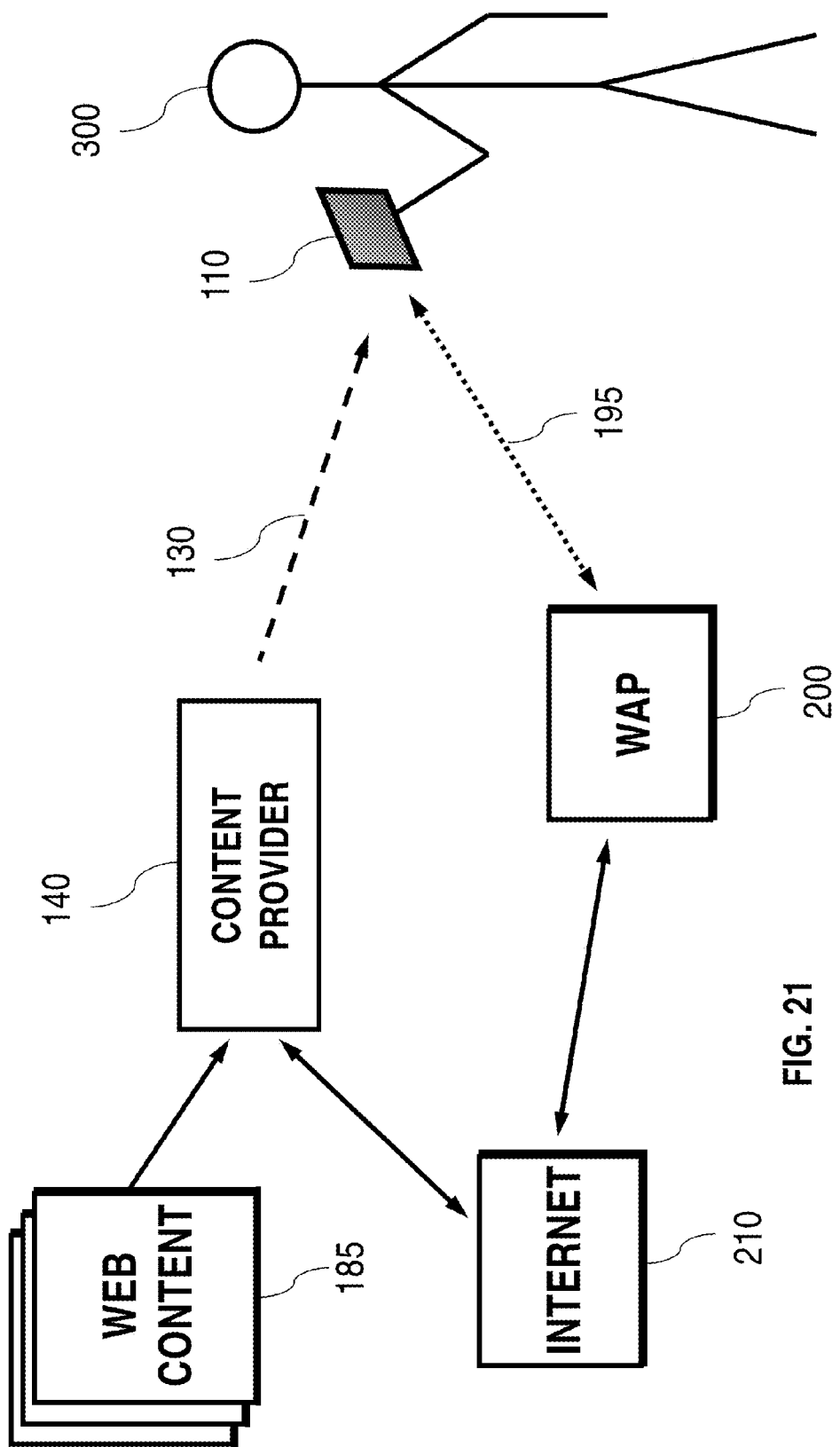
FIG. 21 shows an embodiment wherein a pedestrian user receives web content over-the air and/or from a wireless access point.

FIG. 21 shows an embodiment in which a content provider (140) includes an over-the air broadcast facility. Web content (185) sent to mobile receiver (110) by means of over-the-air transmission path (130) may be sent at the same time as live content (205), providing up-to-the minute information. Transmission of web content over-the-air may be based on available transmission bandwidth, which may be limited, especially for over-the-air transmission facilities that support unicast or multicast transmission to mobile devices. Web content (185) downloaded by means of the wireless access point (200) may be sent at an earlier time, providing a larger amount of information, but at the expense of its timeliness. As one example of sending web content at an earlier time, after the user's program viewing history (e.g., (275) of FIG. 9) has been stored on server (145), adaptive search engine (175) may proactively search for web content (185) in anticipation of the transmission of live content (205), for which the user is likely to be interested in browsing web content related to that live content. For example if the user is interested in New York Giants football, and the Giants are playing on Sunday, adaptive search engine (175) may proactively retrieve and store web content (185) on the preceding Friday about the Giants upcoming game, for example, a video clip of one of the Giants being interviewed on Friday and predicting a victory on Sunday.

Figure 22:
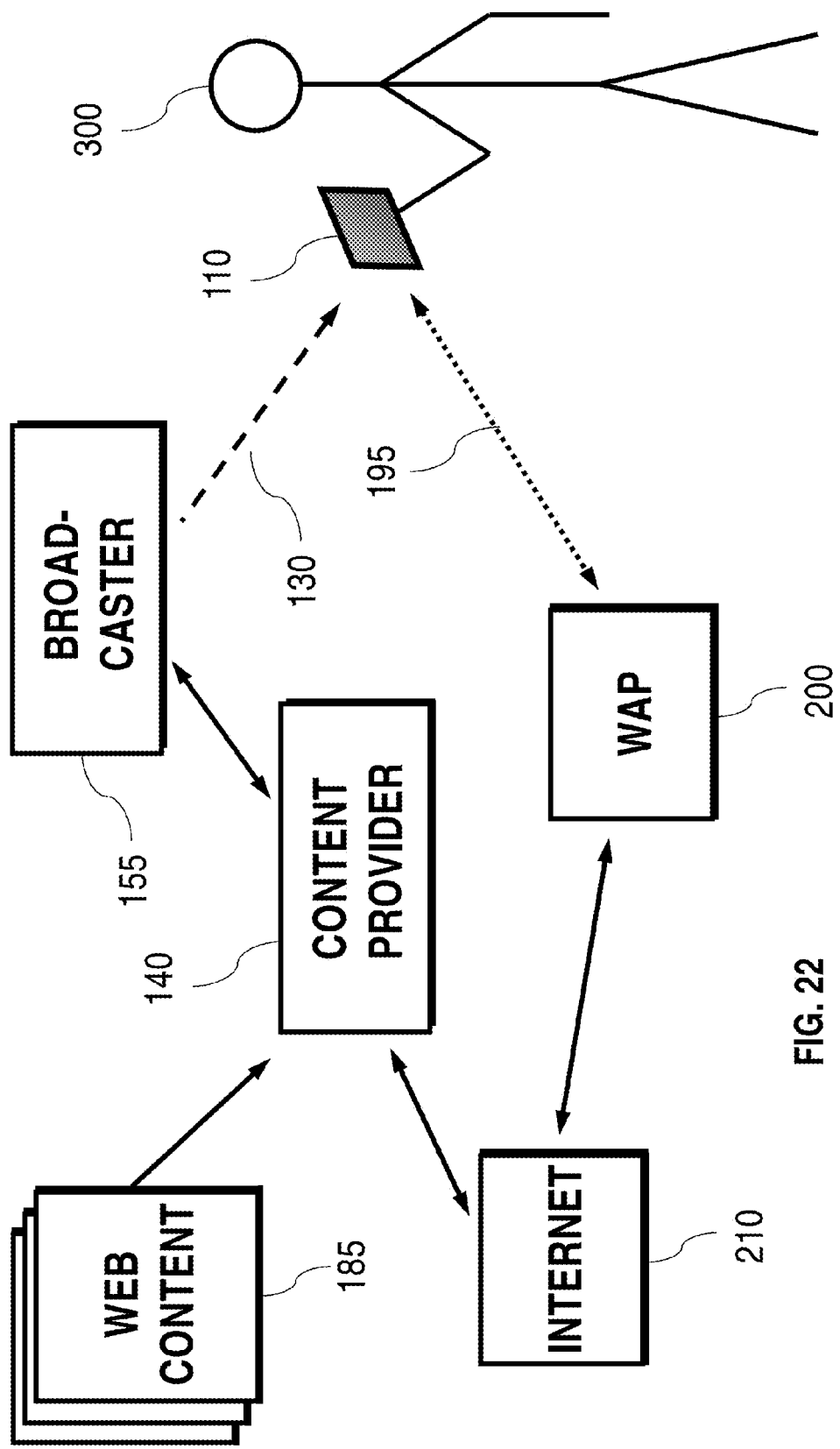
FIG. 22 shows an embodiment wherein a pedestrian user receives live content from a broadcaster and web content from a content provider.

Referring now to FIG. 22, there is shown an embodiment wherein live content is sent over-the-air by broadcaster (155), and web content (185) is sent via internet (210) and WAP (200), to mobile device (110). In this embodiment, as one example, content provider (140) may include server (145), and broadcaster (155) may generate metadata (215) from live content (205) as shown in FIG. 18. For example, content provider (140) may negotiate with broadcaster (155), by sending messages to, and receiving messages from, broadcaster (155), to determine the amount and/or type of metadata to be sent by broadcaster (155) to content provider (140). As another example, broadcaster (155) may send live content (205) to mobile device (110) and may negotiate with content provider (140) as to what web content (185) related to live content (205) may be sent by content provider (140), via internet (210) and WAP (200), to mobile device (110).

In some embodiments, adaptive search engine (175) may be programmed, automatically or manually, by using input from a variety of sources, such as the user's content viewing history, the content location, content schedule, user preferences, social-based recommended preferences, geographic location of the user, and user environment.

In some embodiments, the user's content viewing history, for example (275) of FIG. 9, may be used by adaptive search engine (175) as already described, to automatically retrieve web content (185) of interest to the user.

In some embodiments, the content location may be used by adaptive search engine (175), for example, to retrieve web content (185) from the user's preferred websites. For example, the user may have one or more subscriptions to content located on certain web sites.

In some embodiments, content (185) may be cached on server (145) by adaptive search engine (175) based upon the availability schedule of the content. For example, the user may consult a program guide and instruct adaptive search engine (175) to retrieve certain content according to a predetermined schedule. Alternately or alternatively, the user may instruct adaptive search engine (175) to cache certain content, and adaptive search engine (175) may initiate a search for that content. Adaptive search engine (175) may then schedule that content for caching at such time as that content becomes available in the future.

In some embodiments, the user's preferences may be used by adaptive search engine (175) to cache content on server (145). For example, the user's profile may be stored on server (145) and that profile may specify that the user is interested in accessing certain specific and/or generic content. Adaptive search engine (175) may search for content tagged with metadata (215) that matches the user's profile; such content may then be cached. Generic content may for example, include certain categories such as "news", "sports", "weather" and the like. Arbitrarily long search queries, based on user preferences, may be processed by adaptive search engine (175). For example, the user's preferences may specify that adaptive search engine (175) should search for and cache content related to "latest skiing conditions in central Vermont". In some embodiments, adaptive search engine (175) may infer the user's preferences based upon the user's content access history.

In some embodiments, social-based recommended preferences may be used by adaptive search engine (175) to cache content for the user based on preferences and/or recommendations of others. For example, adaptive search engine (175) may cache content based on knowledge of what web content other users with similar demographics have accessed. In another example, adaptive search engine (175) may cache content for the user based on content access history of one or more other users. In another example, adaptive search engine (175) may cache content based on recommendations from the user's social network, e.g., content recommended by the user's Facebook friends. In yet another example, adaptive search engine (175) may cache content based on recommendations from "expert" users, e.g., users who have specialized knowledge of various types of content.

In some embodiments, content may be cached for the user by adaptive search engine (175) based on the geographic location of the user. For example, the user's current location may be inferred from the location of wireless access point (200) via which the user typically or recently accessed content from the server. Alternatively, the user's receiver (110) may contain a GPS receiver and/or transmitter (not shown in FIG. 18) for relaying the receiver's current location to the adaptive search engine (175). This may enable adaptive search engine (175) to cache content, e.g., city- or region-specific content, "predictively", such that the server (145) has already cached content appropriate to the "next" wireless access point (200) before the receiver accesses that next wireless access point (200). In another example, the adaptive search engine (175) may predict the next access point (200) based upon a history of the user's previously-accessed wireless access points. As one example, the adaptive search engine may cache localized advertisements.

In some embodiments, content may be cached for the user by adaptive search engine (175) based upon the user's environment, e.g., what applications the user has been running on the mobile device. For example, if the user has been playing football games on their mobile device, then adaptive search engine (175) may cache football related web content for subsequent transmission to mobile device (110).

In some embodiments, content may be cached at server (145) and/or any number of wireless access points. For example, from FIG. 18 it will be clear to one of ordinary skill in the art that the overall system of the invention may comprise an arbitrary number of wireless access points (200) in communication with server (145) via internet (210). Content may be cached at any subset of wireless access points (200) that may comprise part of an embodiment of the invention.

In some embodiments, information about a user's content interests may be compiled by the content provider while the user is connected to server (145) via WAP (200). While the user is connected via WAP (200), browser (115) may browse the web continuously (without waiting to become connected via an intermittent connection) and server (145) may compile information about the user's browsing history. Alternatively or additionally, information about the user's "off-line" browsing history, e.g., history of browsing content from memory (116), may be sent to server (145) via WAP (200). Information about the user's content interests may be determined by the server (145) by analyzing the above information about the user's browsing history. For example the server may determine that the user is interested in football from their browsing history, even if the user has never actually viewed football content.

Web content (185) described herein may be any of several types of content, including web pages and multimedia content.

Server (145) maybe operated and maintained by any one or more different parties, such as a service manager, a broadcaster, a content provider, or a content distribution manager.

At any given time, the connection of the user-operated receiver (110) to internet (230) may be by any wireless or wired means, including a hard-wired connection.

User-operated receiver (110) and associated display unit may reside permanently in a fixed location, such as the user's residence.

User-operated receiver (110) and display unit can be permanently or removably attached to a vehicle, for example, as shown in FIG. 6.

Variations of the Invention

Figure 23:
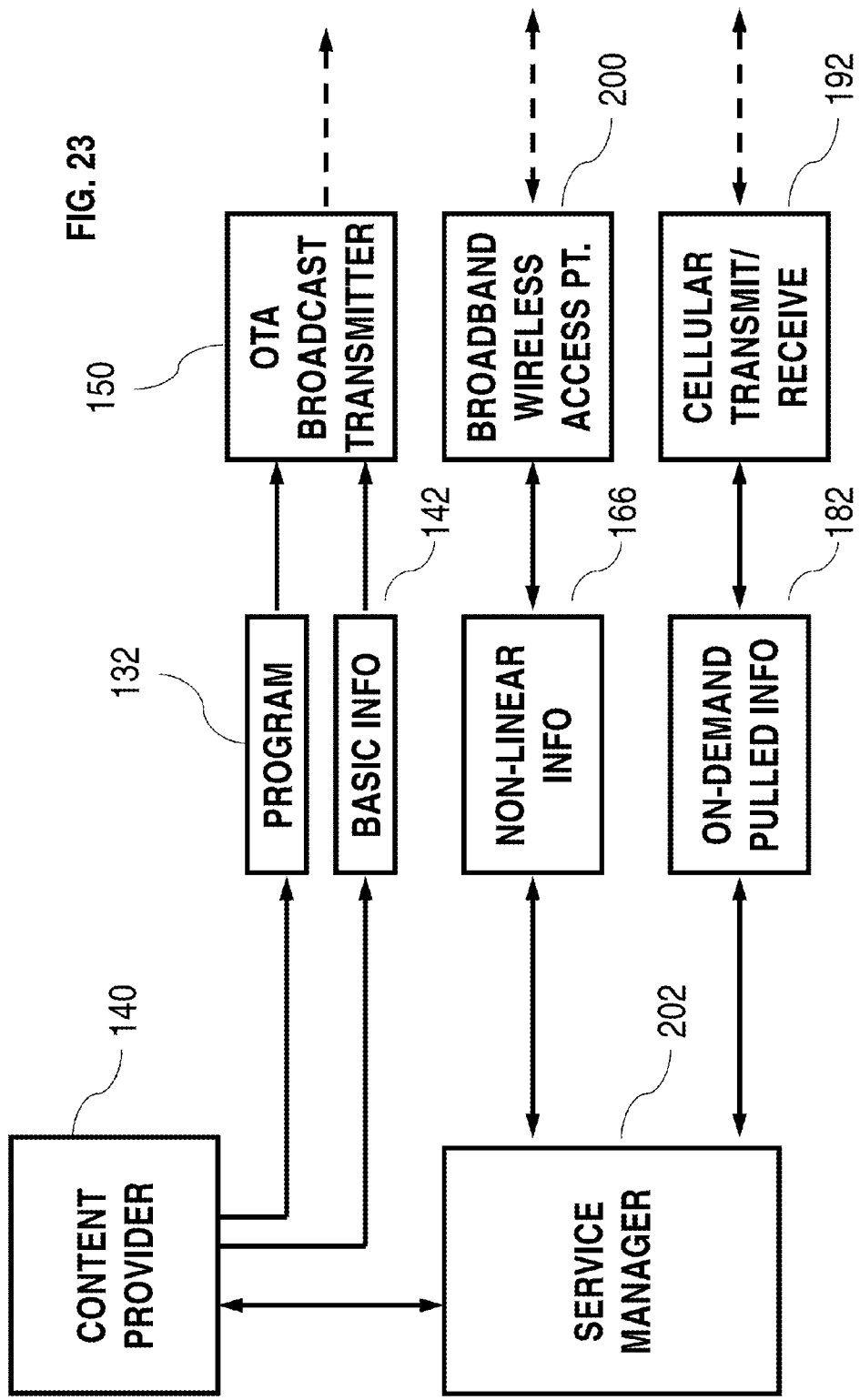
FIG. 23 shows a basic block diagram of one alternate embodiment comprising a service manager.

In an alternate embodiment, as illustrated in FIG. 23, the provision of the non-linear information (166) and on-demand pulled information (182) may be managed by a service manager (202) that is separate from the content provider (140). The service manager (202) may operate independently of the content provider (140).

Figure 24:
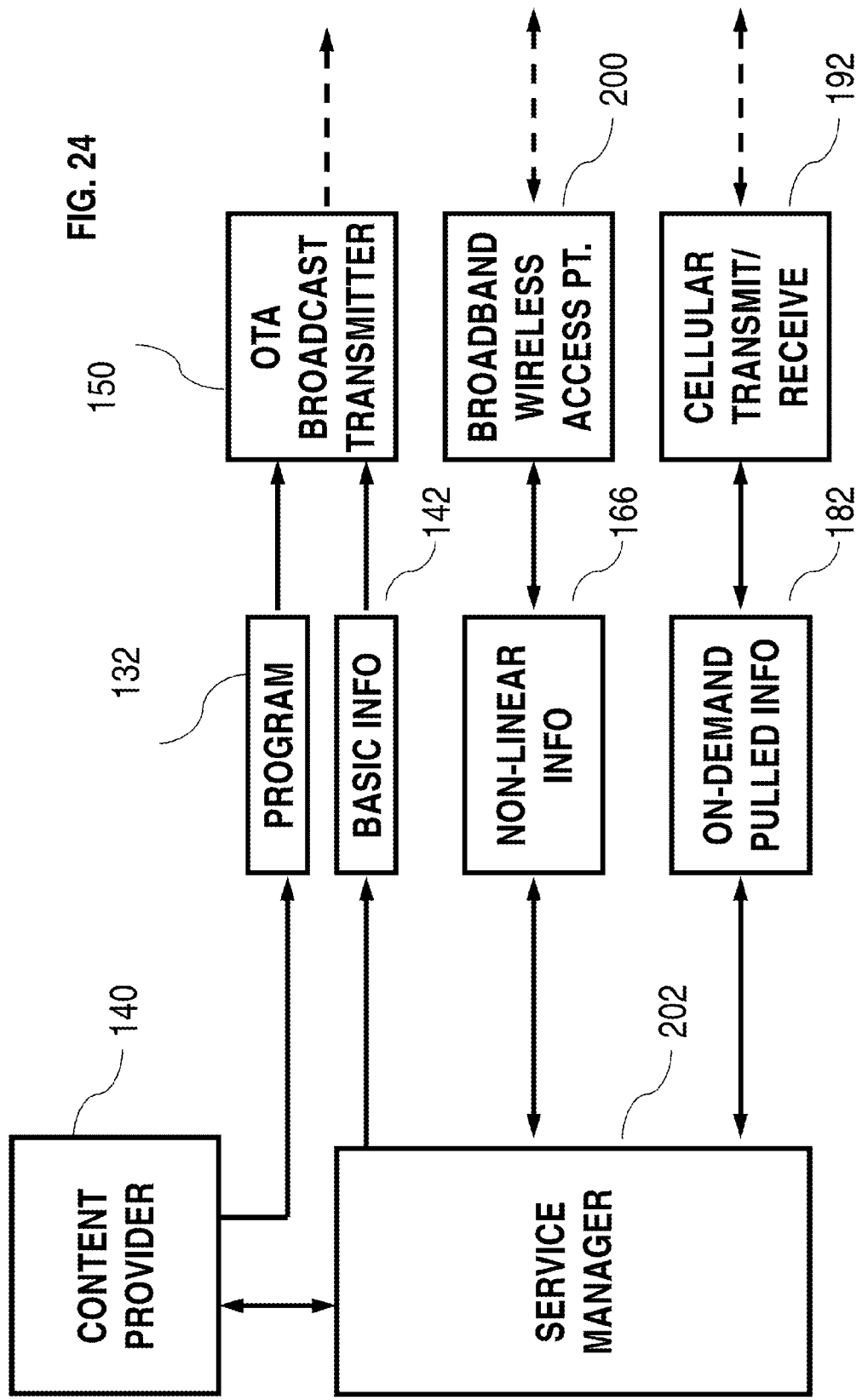
FIG. 24 shows a basic block diagram of another alternate embodiment comprising a service manager.

In another alternate embodiment, as shown in FIG. 24, the service manager (202) may operate together with the content provider (140), and may manage the provisioning of the basic information (142) to the mobile user-operated receivers (110). For example, the provisioning of the basic information (142) may comprise configuring user applications (280), such as modifying the user interface displayed by the mobile device (110) when the user clicks on an applet related to the OTA broadcast (130) of a program.

The over-the-air broadcasts (130) to the mobile user-operated receivers (110) may be by one or more of various wireless schemes, for example terrestrial broadcast or satellite broadcast.

The broadband wireless access connection (195) may be realized by any of various communications technologies, including the family of IEEE-802.11 standards (some of which are commonly referred to as "Wi-Fi"), and the family of IEEE-802.16 standards (some of which are commonly referred to as "WiMAX"), and the like, as known in the wireless communications art.

The cellular telephone network connection via cellular transmitter/receiver (192) may be realized by any of various communications technologies, including 3G, 4G, CDMA, GSM, GPRS, EVDO, EDGE, LTE, and the like, as known in the cellular communications art.

The basic information path to the mobile user-operated receivers may also provide a one-to-one or one-to-some download mechanism for additional information services. The transmission of these additional information services may be the result of direct or indirect user interaction with the mobile user-operated receiver, said interaction being communicated by means of the two-way communication paths via wireless access point (200) and/or cellular receiver (192).

Access to the non-linear information (166) may be enabled upon the first use of a mobile user-operated receiver (110), or it may reside as an option to be purchased at a later time.

Access to the on-demand pulled information (182) in a mobile user-operated receiver (110) may be enabled upon the first use of the mobile user-operated receiver (110), or it may reside as an option in the mobile user-operated receiver (110), to be purchased at a later time.

The information content (142) and/or (166) and/or (182) may be independent of the program content (132).

The program content (132) may reside physically at the content provider (140), or at the service manager (202), or it may reside at other repositories, or it may reside at more than one of these.

The information content (142) and/or (166) and/or (182) may reside physically at the content provider (140), or at the service manager (202), or it may reside at other repositories.

The management and delivery of content (132) and/or (142) and/or (166) and/or (182) may be provided by any one or more of different parties, such as a broadcaster, another content provider, or a content distribution manager.

The two-way connection of the user-operated receiver to the content provider (140) and/or service manager (202) may be by any other wireless or wired means, including a hardwired connection. For example, the mobile device (110) may comprise a television set and the two-way connection may comprise a connection to a cable TV system or the Internet.

The user-operated receiver (110) may reside permanently in a fixed location, such as the user's residence.

Figure 25:
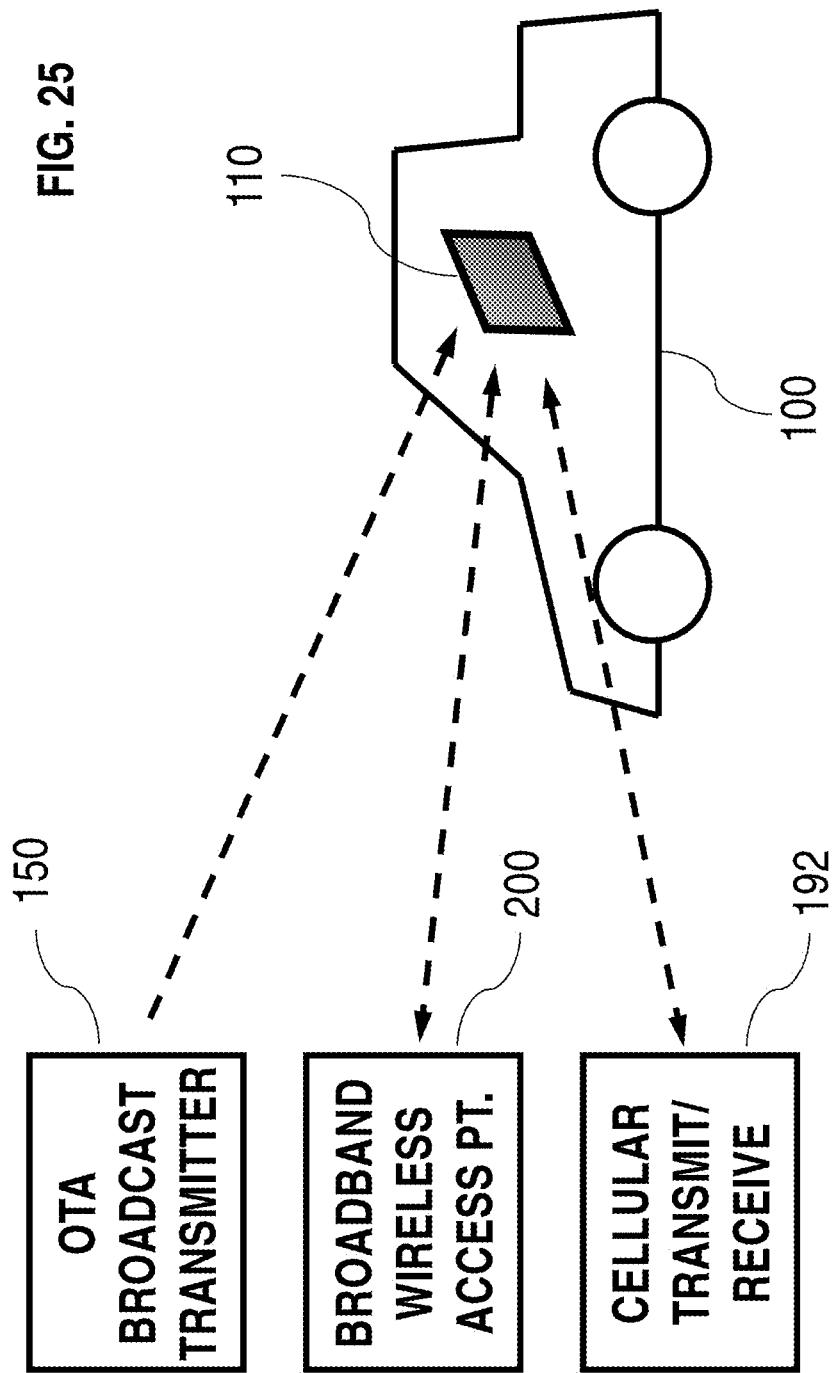
FIG. 25 shows a basic block diagram of an embodiment comprising a mobile receiver affixed to a vehicle.

The user-operated receiver (110) may be permanently attached to a moving vehicle (100), as shown in FIG. 25.

Figure 26:
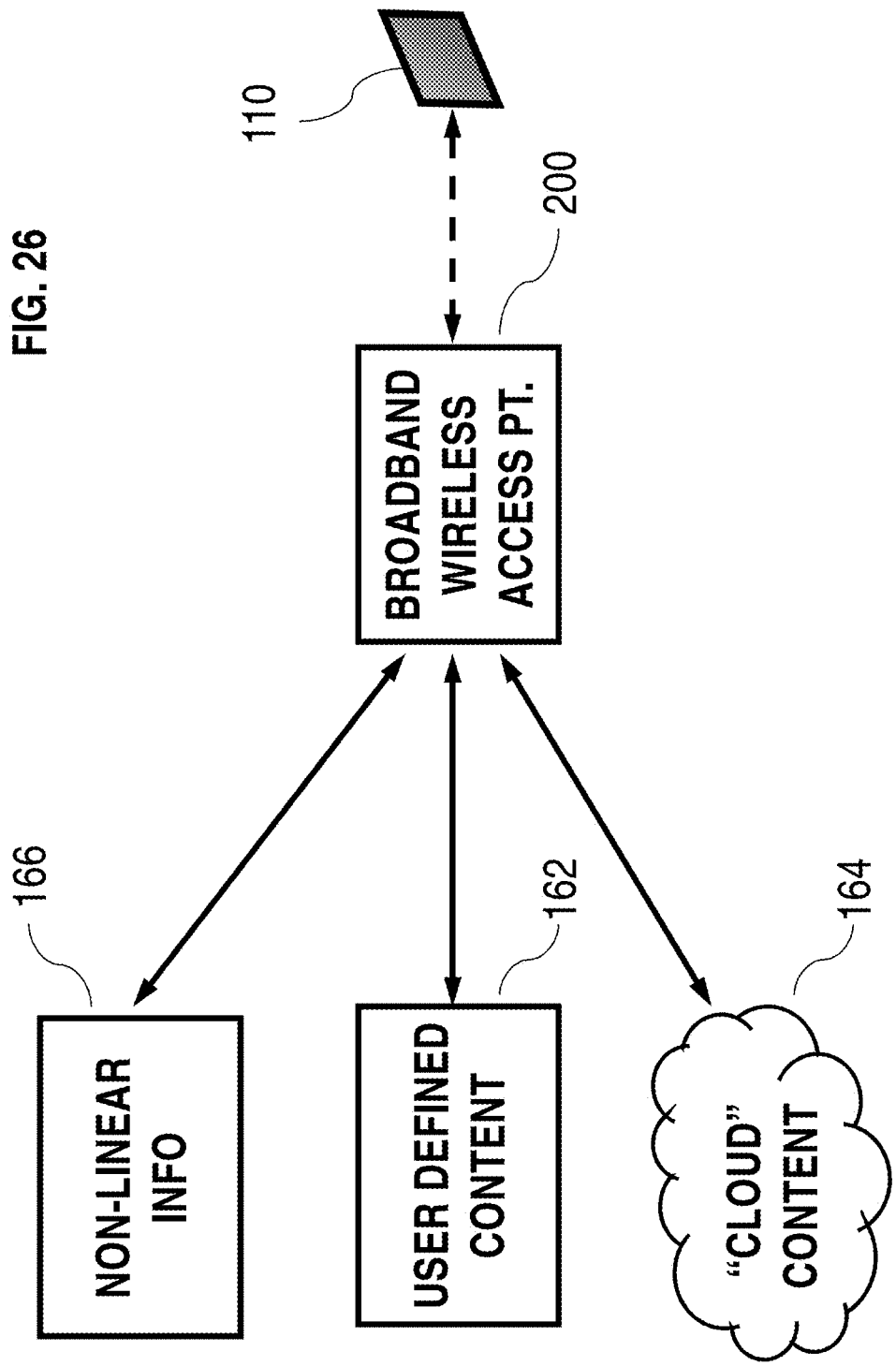
FIG. 26 shows a basic block diagram of an embodiment comprising cloud content.

User defined content (162), as shown in FIG. 26, which may include various forms of program content (132) and information content (142) and/or (166) and/or (182), may also be transferred to the user-operated receiver (110) by means of the wireless access point (200). This user defined content (162) may be stored in and accessed from a personal computer or similar device.

"Cloud" content (164), as also shown in FIG. 26, may also be transferred to the user-operated receiver (110) by means of the wireless access point (200). This "cloud" content (164) may comprise content resident on a plurality of remote storage systems, including but not limited to other users' devices. Cloud content (164) may be provided via a network, for example, the Internet or a private network such as a cable TV network.

The "cloud" content (164) may also be transferred to the mobile device (110) by means of the over-the-air (OTA) broadcast (130).

The "cloud" content (164) may be transferred to the mobile device (110) by means of the cellular transmitter (192).

Figure 27:
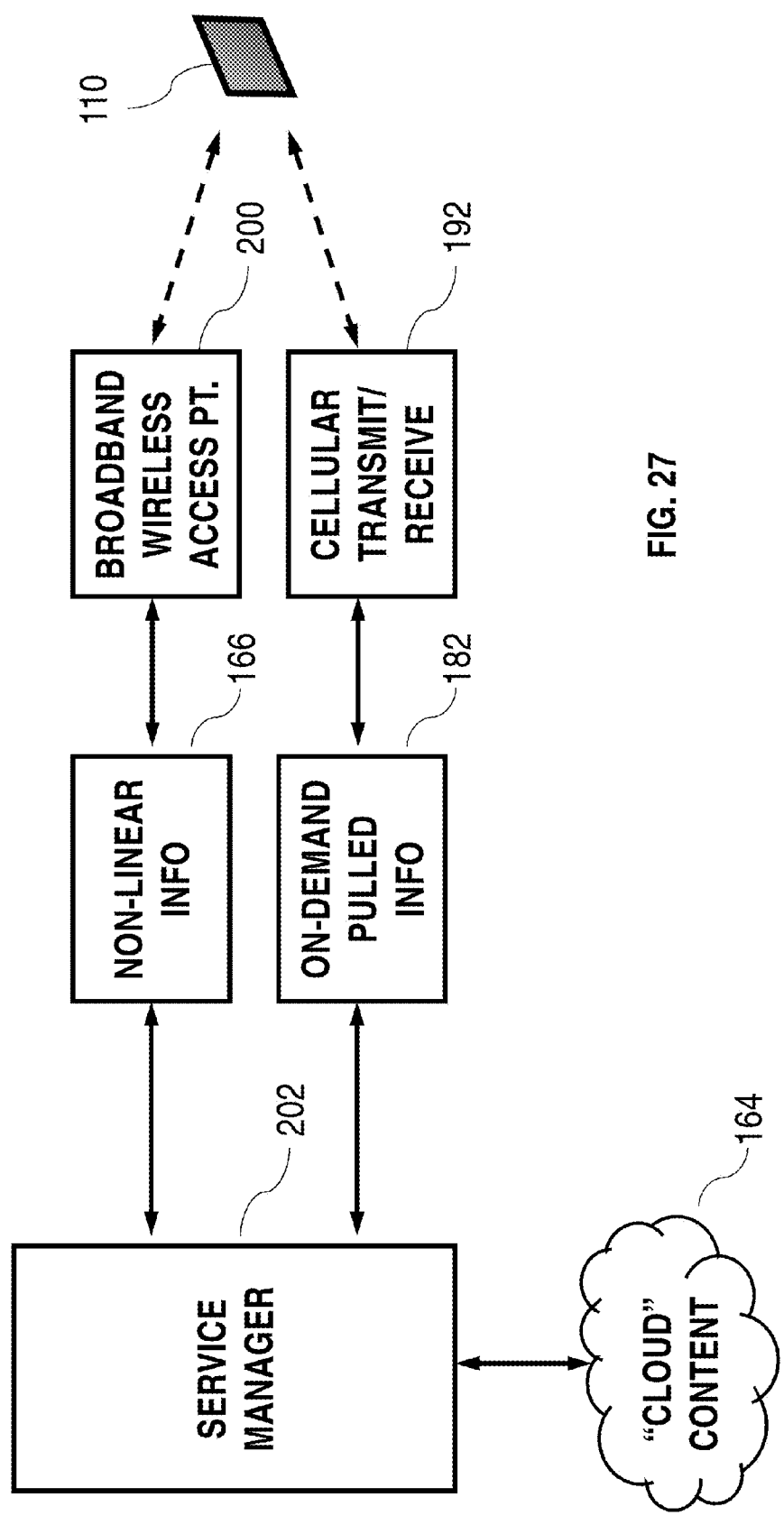
FIG. 27 shows a basic block diagram of an embodiment comprising cloud content interfacing with a service manager.

As shown in FIG. 27, the "cloud" content (164) can may be controlled and managed by the service manager (202).

The "cloud" content (164) may also be controlled and managed by the content provider (140).

The embodiments of the present invention may be implemented with any combination of hardware and software. If implemented as a computer-implemented apparatus, the present invention is implemented using means for performing all of the steps and functions described above.

The embodiments of the present disclosure can be included in an article of manufacture (e.g., one or more computer program products) having, for instance, computer useable or computer readable media. The media has embodied therein, for instance, computer readable program code means, including computer-executable instructions, for providing and facilitating the mechanisms of the embodiments of the present disclosure. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

The invention claimed is:

1. A method of providing interactive services to a set of mobile devices, comprising:
   providing at least one set of first information adapted for over-the-air broadcast to a set of mobile devices by at least one first facility, wherein the first information is selected from the group comprising program content, basic information and cloud content;
   providing at least one set of second information adapted for transmission to at least one of the mobile devices by at least one second facility, wherein the second information is selected from the group comprising non-linear information, on-demand information, cloud content and user-defined content, and wherein the second facility comprises a transmitter selected from the group comprising a short range wireless transmitter in intermittent communication with at least one of the mobile devices and a long range wireless transmitter; and
   receiving at least one set of third information based on information selected from the group comprising the first information and the second information from at least one of the mobile devices, wherein the third information is forwarded by a third facility comprising a receiver selected from the group comprising a short range wireless receiver in intermittent communication with at least one of the mobile devices and a long range wireless receiver, wherein the third information comprises user information received subsequent to a communications session that provides the first or second information upon which the third information is based.

2. The method of claim 1, wherein the third information is selected from the group comprising interactive response information, program usage information, at least one of the mobile device user's viewing preferences, at least one of the mobile device user's device operational preferences, and at least one of the mobile device user's demographic information.

3. The method of claim 1, wherein the second information selected from the group comprising the non-linear information, the cloud content and the user-defined content is sporadically transmitted by the short range wireless transmitter to the mobile device when the mobile receiver is in close proximity to the short range wireless transmitter.

4. The method of claim 1, wherein the third information received by the short range wireless receiver from the mobile device is sporadically received when the mobile device is in close proximity to the short range wireless receiver.

5. The method of claim 1, further comprising authorizing access to at least one portion of the second information to at least one subset of the mobile devices based on one or more criteria, wherein access is authorized by at least one entity selected from the group comprising the content provider, a service manager, the broadcaster, and a distribution manager.

6. The method of claim 5, wherein the criterion comprises payment of a fee.

7. The method of claim 5, wherein the at least one portion of the second information comprises a portion of the non-linear information.

8. A system for providing interactive services to a set of mobile devices, comprising:
a source of at least one set of first information adapted for over-the-air broadcast to a set of mobile devices by at least one first facility, wherein the first information is selected from the group comprising program content, basic information and cloud content;
a source of at least one set of second information adapted for transmission to at least one of the mobile devices by at least one second facility, wherein the second information is selected from the group comprising non-linear information, on-demand information, cloud content and user-defined content, and wherein the second facility comprises a transmitter selected from the group comprising a short range wireless transmitter in intermittent communication with at least one of the mobile devices and a long range wireless transmitter; and
a receiver of at least one set of third information based on information selected from the group comprising the first information and the second information from at least one of the mobile devices, wherein the third information is forwarded by a third facility comprising a receiver selected from the group comprising a short range wireless receiver in intermittent communication with at least one of the mobile devices and a long range wireless receiver, wherein the third information comprises user information received subsequent to a communications session that provides the first or second information upon which the third information is based.

9. The system of claim 8, wherein the source of the program content comprises a content provider.

10. The system of claim 8, wherein the source of the basic information is selected from the group comprising a content provider and a service manager.

11. The system of claim 8, wherein the source of the non-linear information is selected from the group comprising a content provider and a service manager.

12. The system of claim 8, wherein the basic information and the non-linear information are each selected from the group comprising data, web pages, and applications.

13. The system of claim 8, wherein the source of the on-demand information is selected from the group comprising a content provider and a service manager.

14. The system of claim 8, wherein the over-the-air broadcast is selected from the group comprising a terrestrial broadcast and a satellite broadcast.

15. The system of claim 8, wherein the short range wireless transmitter comprises a wireless access point transmitter and the short range wireless receiver comprises a wireless access point receiver.

16. The system of claim 15, wherein the short range wireless transmitter and the short range wireless receiver support a protocol selected from the group comprising Wi-Fi, WiMax, IEEE 802.11x, and IEEE 802.16.

17. The system of claim 8, wherein the long range wireless transmitter comprises a cellular transmitter and the long range wireless receiver comprises a cellular receiver.

18. The system of claim 17, wherein the long range wireless transmitter and the long range wireless receiver support a protocol selected from the group comprising a cellular telephone data protocol, CDMA, 3G, 4G, GSM, GPRS, EVDO, EDGE, and LTE.

19. A method of providing interactive services to a mobile device, comprising:
receiving by a mobile device at least one set of first information adapted for over-the-air broadcast to the mobile device from at least one first facility, wherein the first information is selected from the group comprising program content, basic information and cloud content;
receiving at least one set of second information adapted for transmission to the mobile device from at least one second facility, wherein the second information is selected from the group comprising non-linear information, on-demand information, cloud content and user-defined content, and wherein the second facility comprises a transmitter selected from the group comprising a short range wireless transmitter in intermittent communication with the mobile device and a long range wireless transmitter; and
transmitting at least one set of third information based on information selected from the group comprising the first information and the second information, wherein the third information is received by a third facility comprising a receiver selected from the group comprising a short range wireless receiver in intermittent communication with the mobile device and a long range wireless receiver, wherein the third information comprises user information transmitted subsequent to a communications session that provides the first or second information upon which the third information is based.

20. The method of claim 19, wherein the second information selected from the group comprising the non-linear information, the cloud content, and the user-defined content is sporadically received by the mobile device from the short range wireless transmitter when the mobile device is in close proximity to the short range wireless transmitter.

21. The method of claim 19, wherein the third information transmitted by the mobile device to the short range wireless receiver is sporadically transmitted when the mobile device is in close proximity to the short range wireless receiver.

22. The method of claim 19, wherein the mobile receiver is permanently attached to a vehicle.

* * * * *